United States Patent
Kim et al.

(10) Patent No.: US 12,127,054 B2
(45) Date of Patent: Oct. 22, 2024

(54) METHOD AND DEVICE FOR PERFORMING CELL RESELECTION OPERATION IN UNLICENSED BAND MOBILE COMMUNICATION SYSTEM

(71) Applicant: Samsung Electronics Co., Ltd., Suwon-si (KR)

(72) Inventors: Sangbum Kim, Suwon-si (KR); Himke Van Der Velde, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 17/609,172

(22) PCT Filed: May 7, 2020

(86) PCT No.: PCT/KR2020/006042
§ 371 (c)(1),
(2) Date: Nov. 5, 2021

(87) PCT Pub. No.: WO2020/226439
PCT Pub. Date: Nov. 12, 2020

(65) Prior Publication Data
US 2022/0232437 A1 Jul. 21, 2022

(30) Foreign Application Priority Data
May 9, 2019 (KR) .......................... 10-2019-0054167

(51) Int. Cl.
*H04W 16/14* (2009.01)
*H04W 36/00* (2009.01)
(Continued)

(52) U.S. Cl.
CPC ....... *H04W 36/0079* (2018.08); *H04W 16/14* (2013.01); *H04W 36/305* (2018.08); *H04W 74/0808* (2013.01)

(58) Field of Classification Search
CPC ........... H04W 36/0079; H04W 36/305; H04W 16/14; H04W 74/0808
(Continued)

(56) References Cited

U.S. PATENT DOCUMENTS 10,440,643 B2 * 10/2019 Feng ..................... H04W 48/20
2018/0049221 A1 * 2/2018 Park ..................... H04W 72/56
(Continued)

FOREIGN PATENT DOCUMENTS

EP 3285536 A1 * 2/2018 ............ H04W 16/14
EP 3920593 A1 * 12/2021 ............ H04W 16/14
(Continued)

OTHER PUBLICATIONS

Spreadtrum Communications, 'Consideration of LBT failure in NR-U', R2-1900937, 3GPP TSG-RAN WG2 Meeting #105, Feb. 15, 2019, Athens, Greece.
(Continued)

*Primary Examiner* — Anthony Mejia
(74) *Attorney, Agent, or Firm* — Jefferson IP Law, LLP

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital
(Continued)

education, retail, security and safety-related services, and the like) on the basis of 5G communication technology and IoT-related technology. Disclosed are a method and a device for supporting cell selection of the terminal undergoing UL LBT failure in a mobile communication system.

10 Claims, 21 Drawing Sheets

(51) Int. Cl.
  *H04W 36/30* (2009.01)
  *H04W 74/0808* (2024.01)
(58) Field of Classification Search
  USPC .......................................... 370/331
  See application file for complete search history.

(56) References Cited

U.S. PATENT DOCUMENTS

| | | | | |
|---|---|---|---|---|
| 2019/0124687 A1* | 4/2019 | Yang | .................. | H04L 27/26 |
| 2019/0141702 A1* | 5/2019 | Li | .................. | H04W 72/1215 |
| 2020/0404648 A1* | 12/2020 | Kim | .................. | H04L 5/0044 |
| 2022/0038985 A1* | 2/2022 | Deenoo | .................. | H04W 36/305 |
| 2022/0141737 A1* | 5/2022 | Wang | .................. | H04W 36/08 |
| | | | | 370/331 |

FOREIGN PATENT DOCUMENTS

| KR | 10-2020-0035822 A | 4/2020 | |
|---|---|---|---|
| WO | 2017/136458 A2 | 8/2017 | |
| WO | WO-2017167746 A1 * | 10/2017 | ............ H04W 24/00 |

OTHER PUBLICATIONS

Intel Corporation, 'Detecting and Handling of UL LBT failures', R2-1907382, 3GPP TSG-RAN WG2 106, May 3, 2019, Reno, Nevada, US.

Ericsson, 'Handling UL LBT failures', R2-1901674, 3GPP TSG RAN WG2 #105, Feb. 14, 2019, Athens, Greece.

OPPO, 'Introduce LBT failure counter in MAC layer', R2-1901189, 3GPP TSG-RAN WG2 Meeting #105, Feb. 15, 2019, Athens, Greece.

Korean Office Action dated Aug. 14, 2024, issued in Korean Application No. 10-2019-0054167.

* cited by examiner

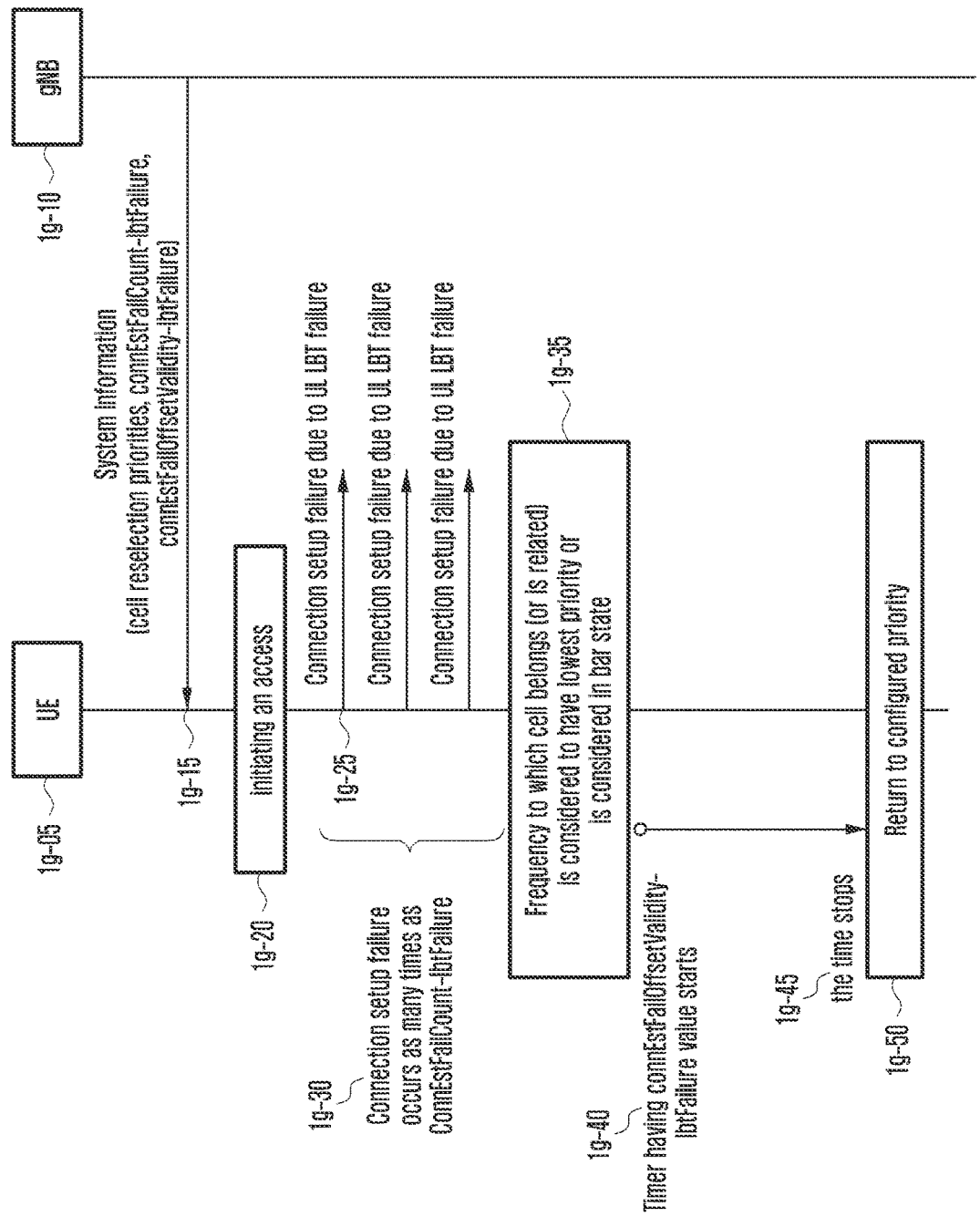

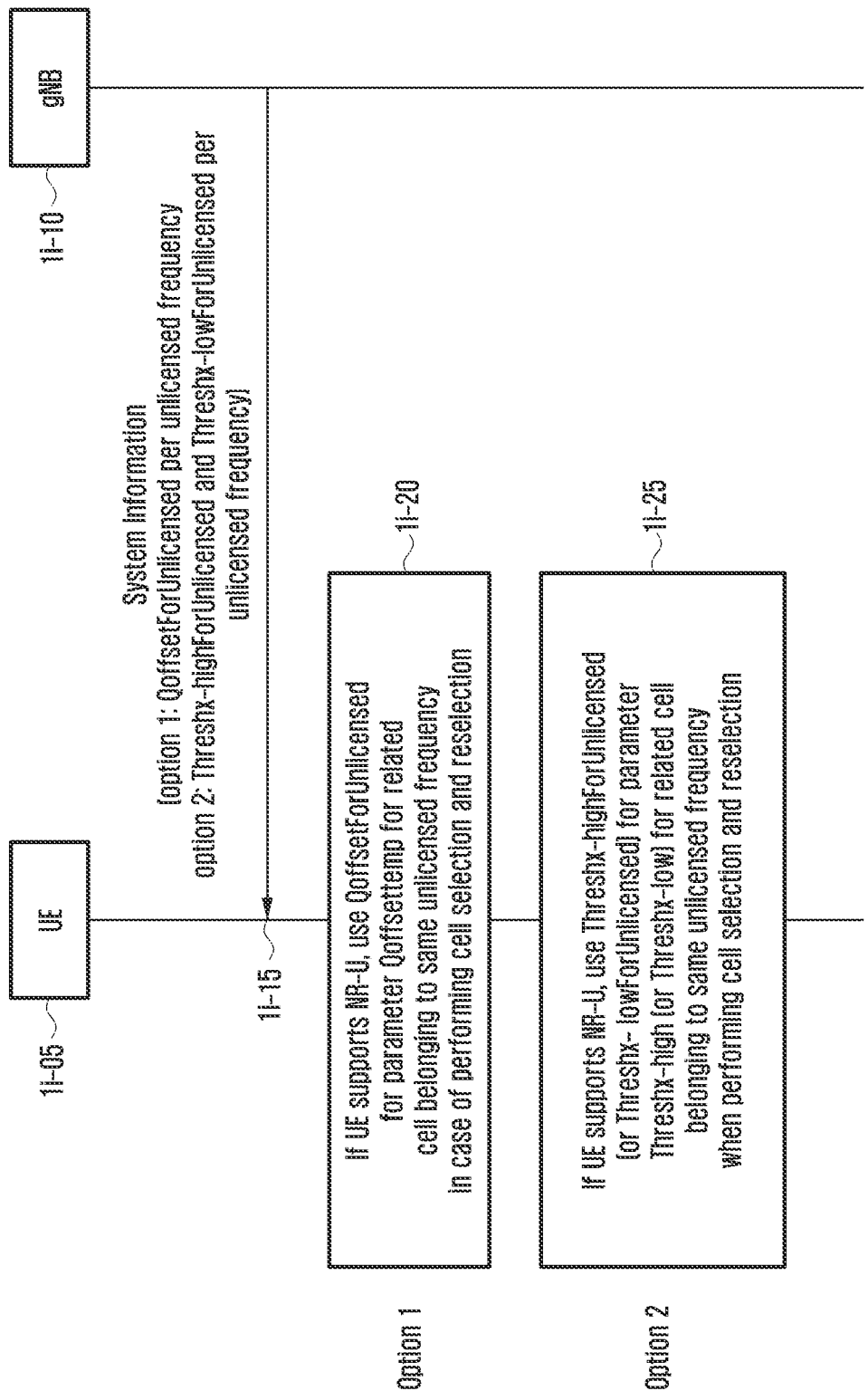

METHOD AND DEVICE FOR PERFORMING CELL RESELECTION OPERATION IN UNLICENSED BAND MOBILE COMMUNICATION SYSTEM

TECHNICAL FIELD

The disclosure relates to a method and a device for supporting cell selection of a terminal suffering an UL LBT failure in a mobile communication system.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System". Implementation of the 5G communication system in ultrahigh frequency (mmWave) bands, e.g., 60 GHz bands, is being considered in order to accomplish higher data transmission rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) network where distributed entities, such as things, exchange and process information. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

Meanwhile, when performing NR mobile communication in an unlicensed frequency band, a terminal camps on a cell having a high priority while considering a predetermined channel quality. When the terminal attempts an access to the cell that the terminal camps on, the unlicensed frequency in which the corresponding cell operates may be highly competitive by other communication entities. Due to this, the terminal may continuously suffer an UL LBT failure.

DISCLOSURE OF INVENTION

Technical Problem

Accordingly, one aspect of the disclosure proposes a method for adjusting a cell reselection priority of an unlicensed frequency to which a camping-on cell belongs in case that terminal suffers an UL LBT failure for a predetermined number of times or more, or fails in a connection setup for a predetermined number of times or more due to the UL LBT failure.

Further, one aspect of the disclosure proposes a method for excluding a cell (or frequency to which the cell belongs) in which an UL LBT failure has occurred from a cell selection operation after an RLF in case that the RLF occurs due to the UL LBT failure.

Solution to Problem

According to an embodiment of the disclosure to solve the above problems, a cell reselection method of a terminal in a wireless communication system includes: receiving system information including parameter information related to a listen before talk (LBT) failure; performing an LBT with respect to a certain cell for a certain frequency band; determining a priority for cell reselection with respect to the frequency band based on the parameter information in case that the LBT failure is detected as the result of performing the LBT; and performing the cell reselection based on the determined priority.

According to an embodiment of the disclosure, a method of a base station in a wireless communication system includes: identifying parameter information related to a listen before talk (LBT) failure; generating system information including the identified parameter information related to the LBT failure; and transmitting the generated system information to the terminal, wherein in case that an LBT is performed by the terminal with respect to a certain cell for a certain frequency band and the terminal detects the LBT failure as the result of performing the LBT, a priority for cell reselection with respect to the frequency band is determined based on the parameter information related to the LBT failure.

According to an embodiment of the disclosure, a terminal performing cell reselection in a wireless communication system includes: a transceiver configured to transmit and receive signals to and from a base station; and a controller configured to control to: receive system information including parameter information related to a listen before talk (LBT) failure, perform an LBT with respect to a certain cell for a certain frequency band, determine a priority for cell reselection with respect to the frequency band based on the parameter information in case that the LBT failure is detected as the result of performing the LBT, and perform the cell reselection based on the determined priority.

According to an embodiment of the disclosure, a base station in a wireless communication system includes: a transceiver configured to transmit and receive signals to and from a terminal; and a controller configured to control to: identify parameter information related to a listen before talk (LBT) failure, generate system information including the identified parameter information related to the LBT failure, and transmit the generated system information to the terminal, wherein in case that an LBT is performed by the terminal with respect to a certain cell for a certain frequency band and the terminal detects the LBT failure as the result of performing the LBT, a priority for cell reselection with respect to the frequency band is determined based on the parameter information related to the LBT failure.

Advantageous Effects of Invention

According to an embodiment of the disclosure, the terminal can camp on the frequency having less competition through the method for applying a Qoffsettemp value of separate S-Criteria and so forth in a situation in which the terminal continuously suffers the UL LBT failure.

Further, since the terminal does not reselect the cell in which the terminal has suffered the UL LBT failure in case that the terminal continuously suffers the UL LBT failure due to congestion of an uplink, the UL LBT failure can be reduced.

BRIEF DESCRIPTION OF DRAWINGS

FIG. 1G is a flowchart of a method for adjusting a cell reselection operation in a second embodiment.

FIG. 1I is a flowchart of a method for adjusting a cell reselection operation in a third embodiment.

FIG. 2H is a diagram describing LBT Type 2.

MODE FOR THE INVENTION

First Embodiment

In describing the disclosure hereinafter, detailed explanation of related known functions or configurations will be omitted if it is determined that it obscures the gist of the disclosure unnecessarily. Hereinafter, embodiments of the disclosure will be described with reference to the accompanying drawings.

Figure 1A:
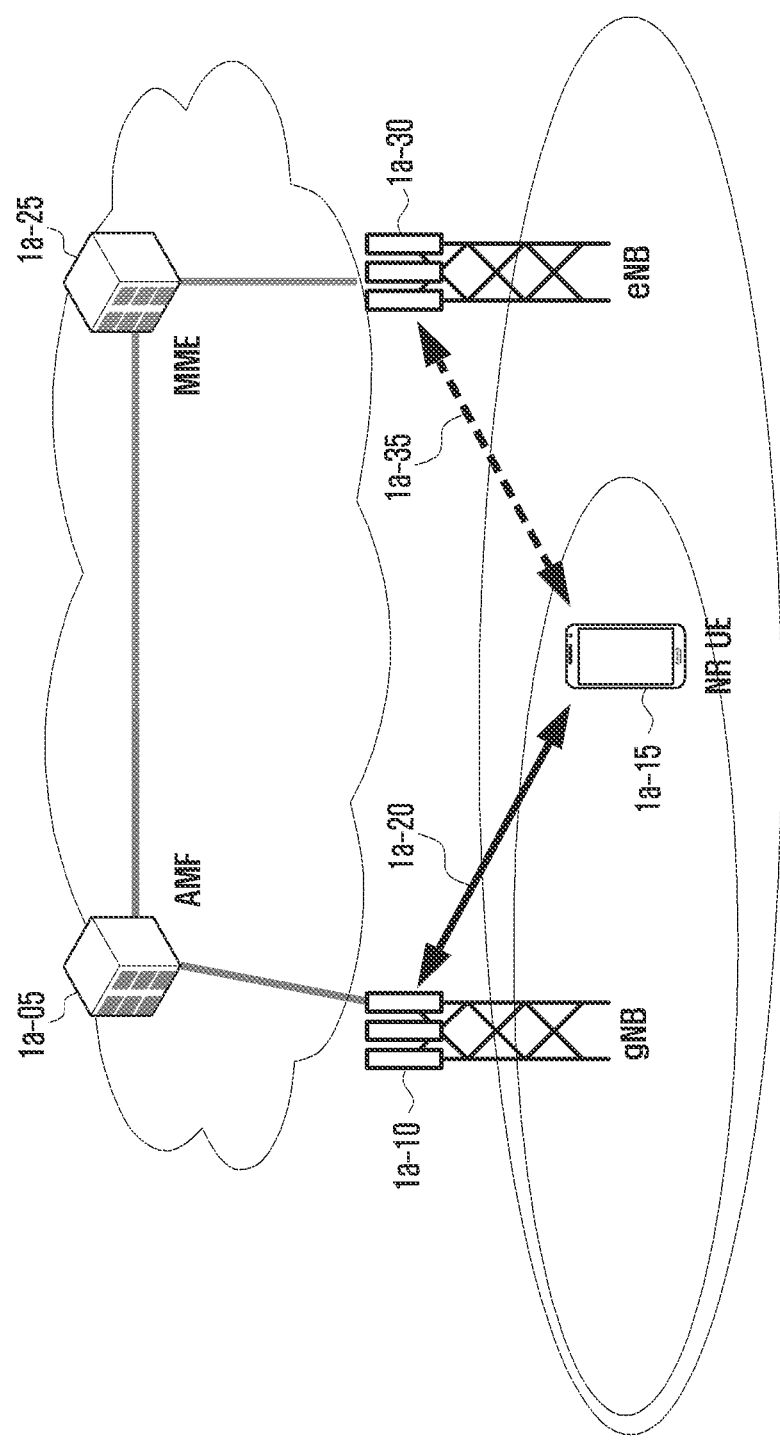
FIG. 1A is a diagram illustrating the structure of a next generation mobile communication system.

FIG. 1A is a diagram illustrating the structure of a next generation mobile communication system.

Referring to FIG. 1A, as illustrated, a radio access network of a next generation mobile communication system (new radio (NR)) is composed of a new radio node B (hereinafter, gNB) 1a-10 and a new radio core network (AMF) 1a-05. A new radio user equipment (hereinafter, NR UE or terminal) 1a-15 accesses an external network through the gNB 1a-10 and the AMF 1a-05.

In FIG. 1A, the gNB corresponds to an evolved node B (eNB) of the existing LTE system. The gNB is connected to the NR UE on a radio channel, and thus it can provide a more superior service than the service of the existing node B (1a-20). Because all user traffics are serviced on shared channels in the next generation mobile communication system, a device, which performs scheduling through consolidation of status information, such as a buffer state, an available transmission power state, and a channel state of each UE, is necessary, and the gNB 1a-10 takes charge of this.

One gNB generally controls a plurality of cells. In order to implement ultrahigh-speed data transmission as compared with the existing LTE, the gNB may have the existing maximum bandwidth or more, and a beamforming technology may be additionally grafted in consideration of the orthogonal frequency division multiplexing (hereinafter, referred to as "OFDM") as a radio access technology. Further, an adaptive modulation & coding (hereinafter, referred to as "AMC") scheme determining a modulation scheme and a channel coding rate is applied to match the channel state of the UE. The AMF 1a-05 performs functions of mobility support, bearer configuration, and QoS configuration.

The AMF is a device taking charge of not only UE mobility management but also various kinds of control functions, and is connected to a plurality of base stations. Further, the next generation mobile communication system may interlock with the existing LTE system, and the AMF is connected to an MME 1a-25 through a network interface. The MME is connected to an eNB 1a-30 that is the existing base station. The UE supporting an LTE-NR dual connectivity may transit and receive data to and from not only the gNB but also the eNB while maintaining connections thereto (1a-35).

Figure 1B:
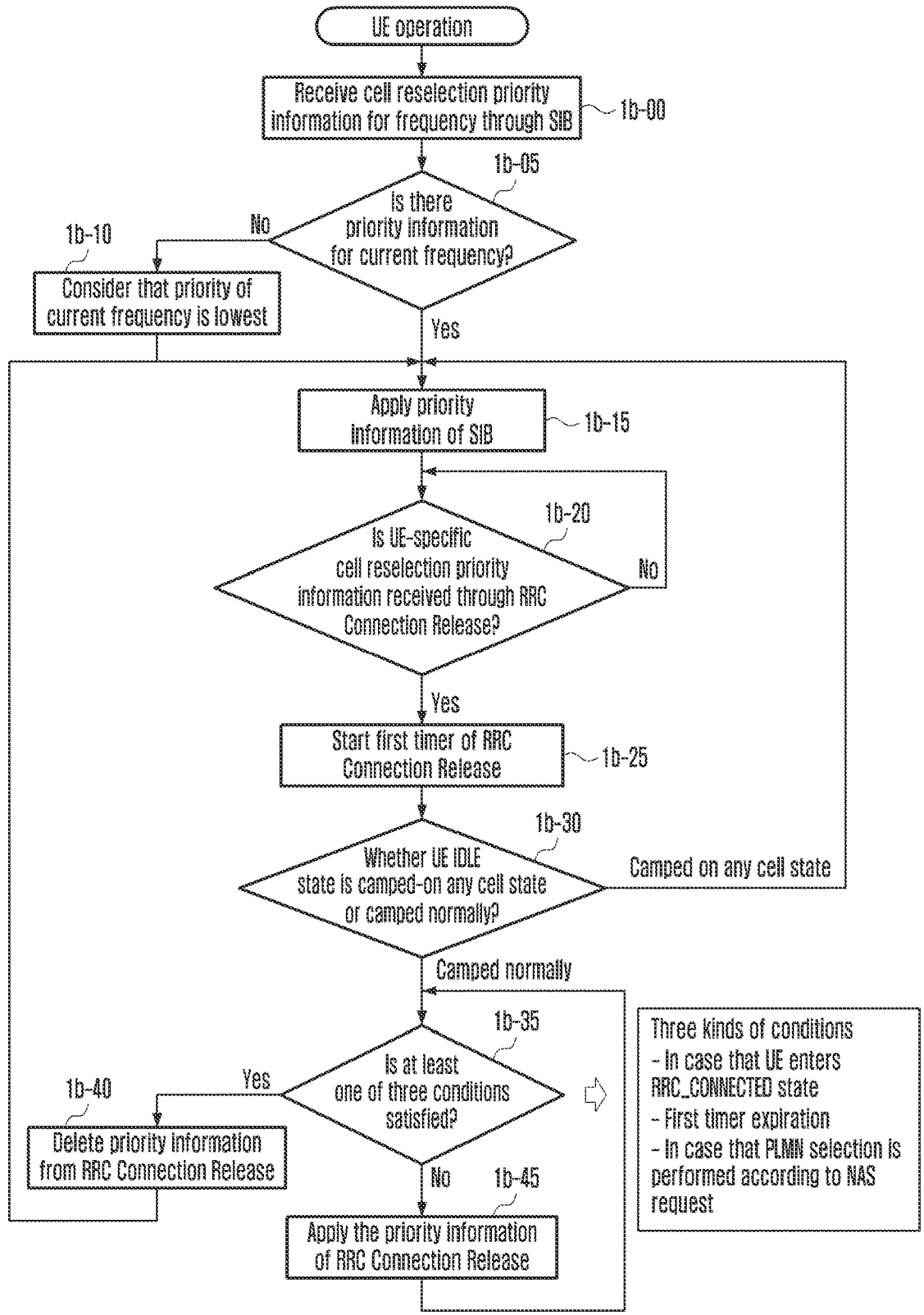
FIG. 1B is a diagram explaining a process in which priority information by frequencies for cell reselection is broadcasted through SIB or is applied to a specific UE through an RRC connection release message that is dedicated RRC signaling according to the disclosure.

FIG. 1B is a diagram explaining a process in which priority information by frequencies for cell reselection is broadcasted through SIB or is applied to a specific UE through an RRC connection release message that is dedicated RRC signaling in an existing LTE technology.

Cell reselection is a process in which a moving UE reselects a serving cell so as to be connected to a cell having the best channel state. A network controls the cell reselection of UEs being in a standby mode by giving priorities by frequencies. For example, if it is assumed that one UE has received priority information on two frequencies f1 and f2, and f1 has a higher priority than that of f2, there is a high probability that the UE stays at f1. Further, in case that the channel state of f2 is not good even if the UE stays at f2, the UE will attempt to change the frequency to f1. The priority information on the frequencies is broadcasted through SIB, or is provided to a specific UE through an RRC connection release message that is dedicated RRC signaling.

In case that the UE is provided with UE-specific priority information through the RRC signaling even if the UE already has the priority information on the frequencies through the SIB, the priority information of the SIB is disregarded. The priority information on the respective frequencies is transferred through cellReselectionPriority IE below, and one of priorities of total X+1 stages is given. As the priority has a lower value, it means that the priority is low. That is, "0" means the lowest priority.

CellReselectionPriority information element
ASN1START
TAG-CELLRESELECTIONPRIORITY-START
CellReselectionPriority::=INTEGER (0 . . . 7)
TAG-CELLRESELECTIONPRIORITY-STOP
ASN1TOP The frequencies between RATs are unable to be given the same priority. In case that an IDLE state of the UE is "camped on any cell state", the frequency priority information received through the SIB is applied, and the priority information received through the RRC signaling is not used, but is stored only. The cellReselectionPriority IE is an optional IE, and may not exist. In this case, the priority information on the corresponding frequency is not given. At this time, the UE considers that the priority of the corresponding frequency is at the lowest stage.

At operation 1b-00, the UE is provided with the priority information on the frequencies used in not only EUTRA but also other RATs through the SIB. However, the priority information is not necessarily provided with respect to all frequencies. Also, the priority information on the frequency of the currently camped serving cell may not be provided. At operation 1b-05, the UE identifies this. If the priority information on the frequency of the current serving cell is not provided, it is considered that the priority of the frequency is at the lowest stage. At operation 1b-15, the UE applies the priority information on the respective frequencies. If the RRC connection release message is received from a base station, the UE is switched from a connected mode to an IDLE mode. The RRC message may include the priority information of the frequency. This information is UE-specific information, and is applied more preferentially than the frequency priority information normally provided from the SIB. Accordingly, at operation 1b-20, the UE identifies whether the frequency priority information exists in the RRC message. If it exists, the UE, at operation 1b-25, drives a first timer by applying the first timer value included together. At operation 1b-30, the UE determines whether the current standby mode state is a "camped on any cell state" or a "camped normally state". The "camped normally state" is called a state where the UE camps on a suitable cell. The suitable cell is a cell that can provide a normal service to the UE, and is a cell that satisfies the following detailed conditions.

Cell corresponding to a selected PLMN, a registered PLMN, or one PLMN in an equivalent PLMN list
Cell that is not barred
Cell satisfying cell selection criterion
The "camped on any cell state" is called a state where the UE is unable to camp on a suitable cell, but camps on an acceptable cell. In the acceptable cell, a normal service is not possible, and the UE can attempt an emergency call only. The acceptable cell is a cell satisfying the following conditions.
Cell that is not barred
Cell satisfying cell selection criterion If the UE is in a standby state of the "camped on any cell state", it returns to operation 1b-15 and applies the frequency priority information provided from the SIB instead of the priority information provided from the RRC connection release message. If the UE is in a standby state of the "camped normally state", the UE, at operation 1b-35, determines whether at least one of the following three kinds of conditions is satisfied. The three kinds of conditions are as follows.

The UE is switched to a connected mode.
The first timer has expired.
In accordance with a NAS request, a PLMN selection process is performed.

If any one of the above conditions is satisfied, the UE, at operation 1b-40, discards the priority information provided from the RRC connection release message, and returns to operation 1b-15 to apply the frequency priority information provided from the SIB. However, if neither of the conditions is satisfied, the UE, at operation 1b-45, applies the priority information provided from the RRC connection release message.

The frequency priority information exerts an influence on the measurement of a specific frequency by the UE. The UE always performs the measurement with respect to the frequency having a higher priority than that of the current serving cell. In contrast, as for the same frequency as the serving cell (intra-frequency) or other frequencies having the priority that is equal to or lower than the priority of the intra-frequency, the measurement of the corresponding frequencies is not always performed to save the UE power. The measurement is performed when a channel QoS of the serving cell is smaller than or equal to a specific threshold value.

Cell reselection is performed in order to move to a cell having a good channel state, and if the channel QoS of the current serving cell is good, there is no reason to have to move to the frequency having the same or low priority. Accordingly, in order to reduce power consumption due to an unnecessary channel measurement, whether to perform the measurement is determined based on the specific threshold value. In case of the same frequency (intra-frequency), if the QoS of the serving cell is equal to or lower than the specific threshold value Sintrasearch, the channel measurement is performed with respect to other cells having the same frequency. In case of other frequencies having the same or low priority, if the QoS of the serving cell is equal to or lower than the specific threshold value Snonintrasearch, the channel measurement is performed with respect to the cells of the corresponding other frequencies. In general, the channel QoS considers RSRP and RSRQ.

If the channel QoS of the cell of the frequency having the high priority becomes higher than a specific threshold value ThreshX-high while the measurement is performed as above, the UE reselects the cell of the frequency having the high priority as the serving cell. If the channel QoS of the cell of the frequency having a lower priority becomes higher than the specific threshold value ThreshX-low, and the QoS of the serving cell becomes lower than the ThreshServing-low, the UE reselects the cell of the frequency having the low priority as the serving cell.

Figure 1C:
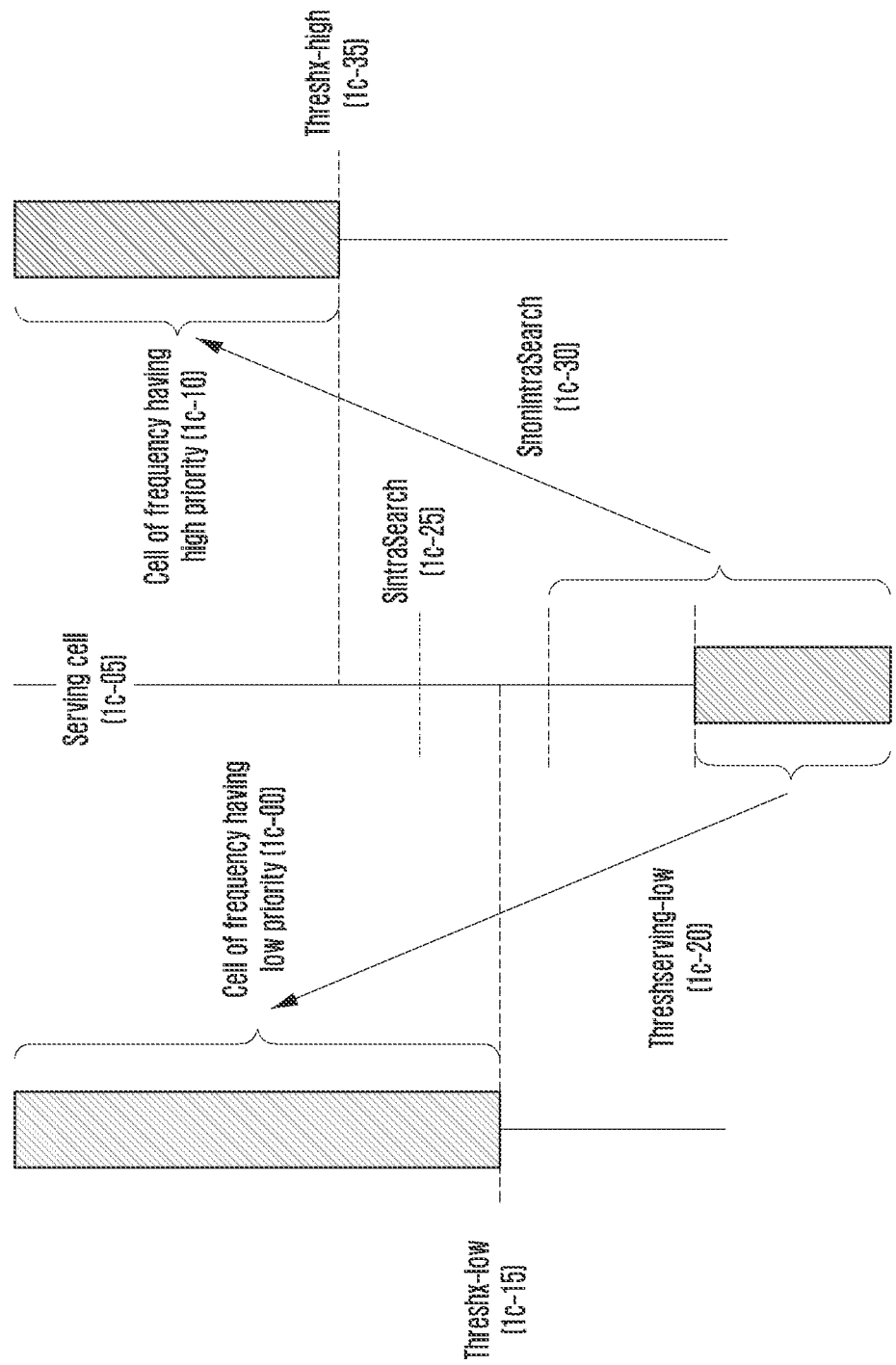
FIG. 1C is a diagram explaining a method in which a UE performs cell reselection according to the disclosure.

FIG. 1C is a diagram explaining a method in which a UE performs cell reselection according to the disclosure.

The UE always performs inter-freq/RAT measurement with respect to the frequency or RAT having the high priority regardless of the measurement signal strength for the serving cell. If the measurement signal strength for the serving cell is lower than SintraSearch (1c-25), the UE performs intra-freq measurement. If the measurement signal strength for the serving cell is lower than SnonintraSearch (1c-30), the UE performs inter-freq/RAT measurement with respect to the frequency having the priority that is equal to or lower than that of the frequency of the current serving cell. The reason why to trigger the UE measurement in stages is to reduce the power consumption of the UE due to neighboring cell measurement.

If the channel QoS of the cell (1c-00) of the frequency having the high priority becomes higher than the specific threshold value ThreshX-high (1c-35), the UE reselects the cell of the frequency having the high priority as the serving cell. If the channel QoS of the cell (1c-00) of the frequency having the low priority becomes higher than the specific threshold value ThreshX-low (1c-15), and the QoS of the serving cell becomes lower than the ThreshServing-low (1c-20), the UE reselects the cell of the frequency having the low priority as the serving cell.

During the cell reselection, the received signal strength (RSRP) or a received signal quality (RSRQ) may be considered. The received signal strength or the received signal quality means a value calculated by S-Criteria. That is, it is Srxlev or Squal.

Respective value in the above expressions may be defined as follows:

TABLE 1

| | |
|---|---|
| Srxlev | Cell selection reception (RX) level value (dB) |
| Squal | Cell selection quality value (dB) |
| Qoffset$_{temp}$ | Offset temporarily applied to a cell as specified in TS 38.331 [3] (dB) |
| Q$_{rxlevmeas}$ | Measured cell reception (RX) level value (RSRP) |
| Q$_{qualmeas}$ | Measured cell quality value (RSRQ) |
| Q$_{rxlevmin}$ | Minimum required reception (RX) level in the cell (dBm). If the UE supports SUL frequency for this cell, Qrxlevmin is obtained from q-RxLevMinSUL if it is present in SIB1, SIB2 and SIB4, and additionally, if Q$_{rxlevminoffsetcellSUL}$ is present in SIB3 and SIB4 for the concerned cell, this cell specific offset is added to the corresponding Qrxlevmin to achieve the required minimum reception (RX) level in the concerned cell; Else, Qrxlevmin is obtained from q-RxLevMin in SIB1, SIB2 and SIB4, and additionally, if Q$_{rxlevminoffsetcell}$ is present in SIB3 and SIB4 for the concerned cell, this cell specific offset is added to the corresponding Qrxlevmin to achieve the required minimum reception (RX) level in the concerned cell. |

TABLE 2

| | |
|---|---|
| Q$_{qualmin}$ | Minimum required quality level in the cell (dB). Additionally, if Q$_{qualminoffsetcell}$ is signaled for the concerned cell, this cell specific offset is added to achieve the required minimum quality level in the concerned cell. |
| Q$_{rxlevminoffset}$ | Offset to the signaled Q$_{rxlevmin}$ taken into account in the Srxlev evaluation as a result of a periodic search for a higher priority PLMN while camped normally in a VPLMN, as specified in TS 23.122 [9]. |
| Q$_{qualminoffset}$ | Offset to the signaled Q$_{qualmin}$ taken into account in the Srxlev evaluation as a result of a periodic search for a higher priority PLMN while camped normally in a VPLMN, as specified in TS 23.122 [9]. |
| P$_{compensation}$ | If the UE supports the additionalPmax included in the NR-NS-PmaxList, if it is present in SIB1, SIB2 and SIB4:<br>max(P$_{EMAX1}$ − P$_{PowerClass}$, 0) − (min(P$_{EMAX2}$, P$_{PowerClass}$) − min(P$_{EMAX1}$, P$_{PowerClass}$)) (dB);<br>else:<br>max(P$_{EMAX1}$ − P$_{PowerClass}$, 0) (dB) |
| P$_{EMAX1}$, P$_{EMAX2}$ | Maximum transmission (TX) power level of a UE may be used when transmitting the uplink in the cell (dBm) defined as P$_{EMAX}$ in TS 38.101 [15]. If UE supports SUL frequency for this cell, P$_{EMAX1}$ and P$_{EMAX2}$ are obtained from the p-Max for SUL in SIB1 and NR-NS-PmaxList for SUL respectively in SIB1, SIB2 and SIB4 as specified in TS 38.331 [3], else, P$_{EMAX1}$ and P$_{EMAX2}$ are obtained from the p-Max and NR-NS-PmaxList respectively in SIB1, SIB2 and SIB4 for normal UL as specified in TS 38.331 [3]. |
| P$_{PowerClass}$ | Maximum RF output power of the UE (dBm) according to the UE power class as defined in TS 38.101-1 [15]. |

In particular, in case of an inter-RAT cell reselection to NR, Srxlev is used, and the Srxlev value is compared with the specific threshold value ThreshX-high or ThreshX-low. In the disclosure, if an LTE base station provides q-RxLevMinSUL value for a specific NR frequency through system information, and the UE supports SUL, it is featured to derive the Srxlev value by applying the q-RxLevMinSUL value as the Qrxlevmin value of the Srxlev when performing the inter-RAT cell reselection to an NR cell belonging to the NR frequency. If the q-RxLevMinSUL value is provided by NR frequencies, and NR cells belonging to a specific NR frequency support the SUL, the q-RxLevMinSUL value for the specific NR frequency is provided. With respect to the NR frequency that does not support the SUL, the q-RxLevMinSUL value is not provided. In case of using the received signal quality, that is, RSRQ, the base station separately provides Threshserving-lowQ, ThreshX-lowQ, and ThreshX-highQ to the UE through broadcasting. In case of using the received signal strength, Threshserving-lowP, ThreshX-lowP, and ThreshX-highP are used.

Figure 1D:
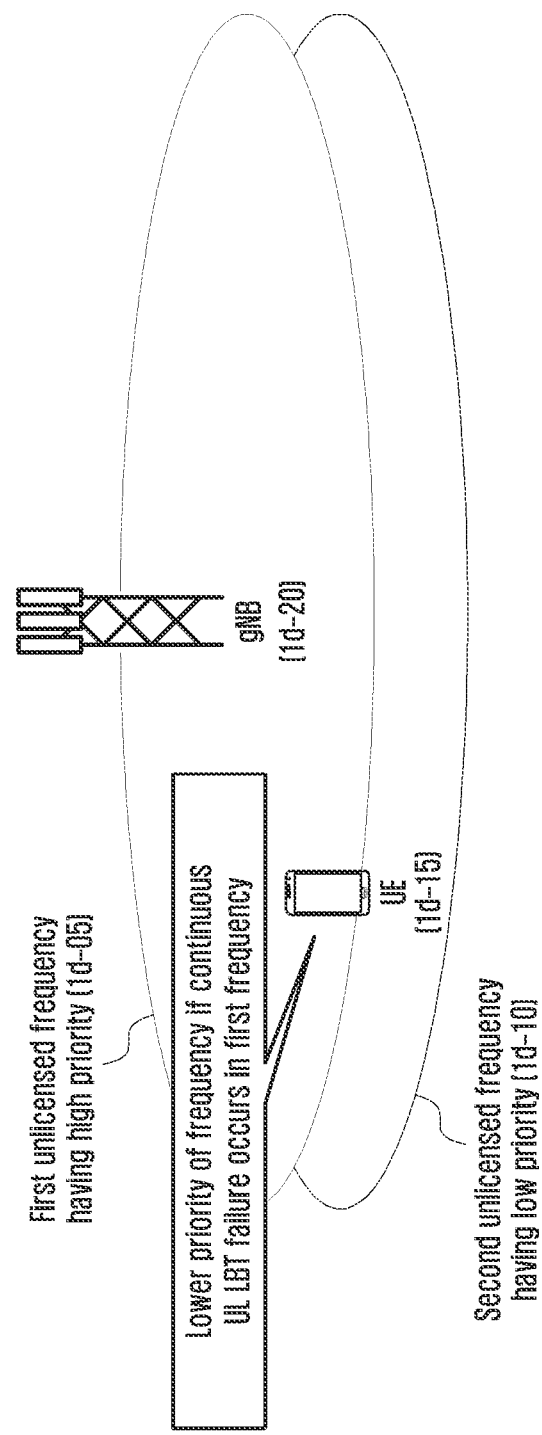
FIG. 1D is a diagram explaining the reason why it is necessary to adjust a cell reselection priority in an unlicensed band mobile communication system.

FIG. 1D is a diagram explaining the reason why it is necessary to adjust a cell reselection priority in an unlicensed band mobile communication system.

An NR mobile communication being performed in an unlicensed frequency band is called an NR-U. In the NR-U, there exist a scenario of configuring SCell operating in an unlicensed frequency band through PCell operating in a licensed frequency band and a PCell scenario operating in the unlicensed frequency band. In the latter, an operation in a standby mode (RRC_Idle), such as cell (re)selection, paging monitoring, and the like, should be supported in the UE. In the unlicensed frequency band, the channel can be occupied for a predetermined time, and data transmission can be performed through competition with another system/UE, such as WiFi and an NR-U system/UE of another business owner. The channel occupation and data transmission operation through the competition is referred to as an LBT operation. The LBT operation is performed every predetermined time, and at this time, the communication subject that wins the competition can transmit data. For example, in order to transmit a certain thing, such as a preamble, a control message, or user data, on an uplink, the UE should first perform an uplink LBT operation (UL LBT). If the UL LBT is successfully completed, the UE can transmit the thing intended to be sent to the uplink. If the UL LBT fails, the UE retriggers the UL LBT operation after the predetermined time elapses. Normally, the UL LBT failure can be recognized by the UE.

The standby mode UE 1d-15 supporting the NR-U may move to a service area of one or more NR-U cells using another unlicensed frequency band. As described above, a cell reselection priority is given to the unlicensed frequency band to which the NR-U cell belongs through system information or a dedicated RRC message. The UE camps on the NR-U having a high priority while considering a predetermined channel quality.

When the UE attempts an access to the camping-on cell, the unlicensed frequency 1d-05 in which the corresponding cell operates is under severe competition by other communication entities. Due to this, the UE may continuously suffer the UL LBT failure.

The disclosure proposes a method for adjusting a cell reselection priority of an unlicensed frequency to which the camping-on cell belongs in case that the UE suffers an UL LBT failure for a predetermined number of times or more, or fails in a connection setup for a predetermined number of times or more due to the UL LBT failure. The disclosure proposes a method for applying a Qoffsettemp value of a new separate S-Criteria being applied in the above problem situation, and a method for considering the cell reselection priority of the frequency in the problem situation as the lowest priority or in a bar state.

Through the above methods, the UE can camp on the frequency 1d-10 having less competition.

An NR-U cell operating in an unlicensed frequency band and a normal cell operating in a licensed frequency band may coexist. A business owner may want to configure so that UEs preferentially camp on a normal cell operating in a licensed frequency band in the above scenarios. For this, different cell reselection priority values may be given to the unlicensed frequency and the licensed frequency.

As an alternative to this, the disclosure proposes a method for providing a separate Qoffsettemp for each separate unlicensed frequency and applying this in the cell selection and reselection processes, or a method for providing separate ThreshX-high and ThreshX-low values being applied to the unlicensed frequency and applying them in the cell selection and reselection processes.

Figure 1E:
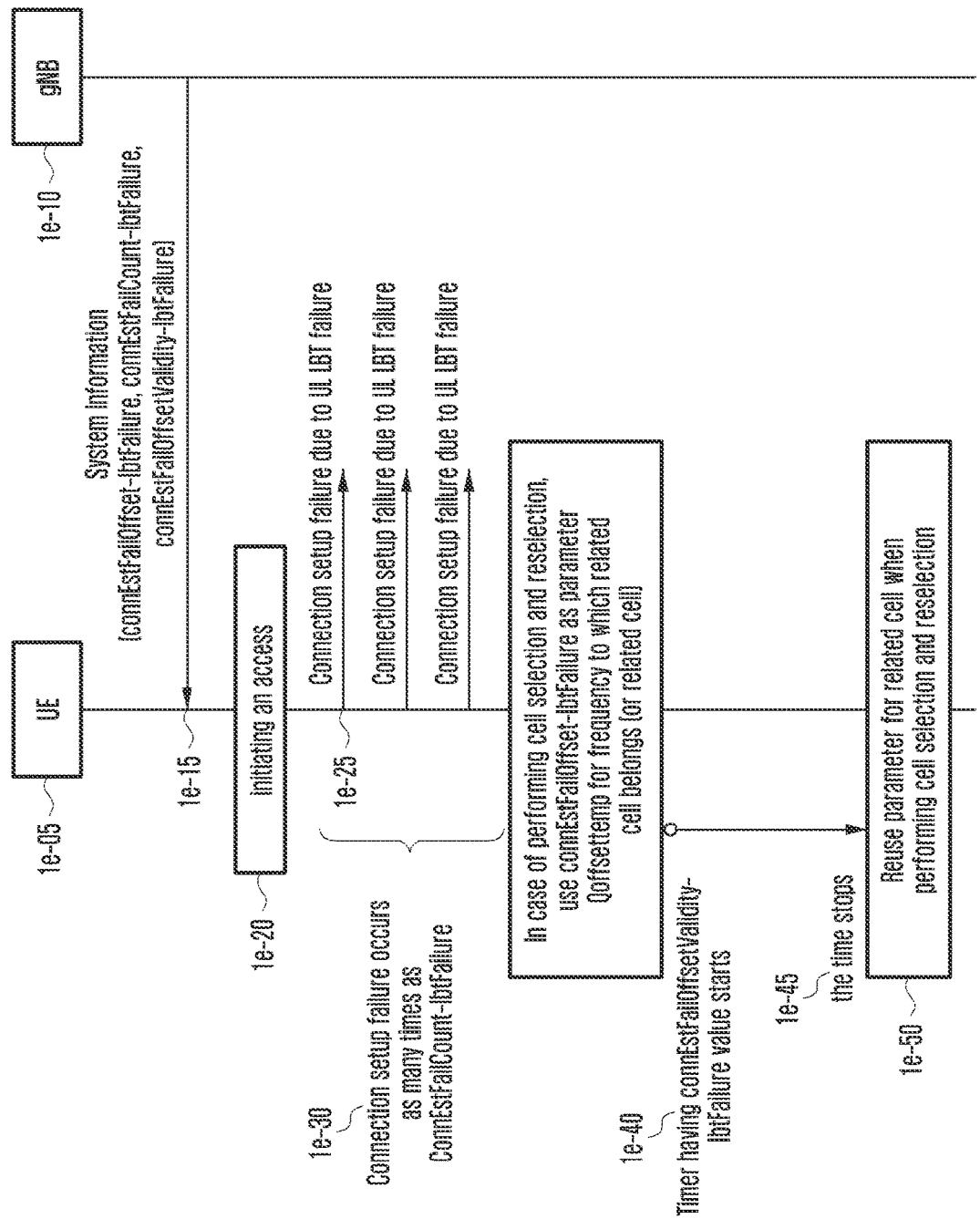
FIG. 1E is a flowchart of a method for adjusting a cell reselection operation in a first embodiment.

FIG. 1E is a flowchart of a method for adjusting a cell reselection operation in a first embodiment.

In the first embodiment, a base station 1e-10 provides three kinds of parameters below to a UE 1e-05 through system information (1e-15). The system information is SIB1 being always broadcasted.
  connEstFailOffset-lbtFailure
  connEstFailCount-lbtFailure
  connEstFailOffsetValidity-lbtFailure The UE stores the parameters. The UE triggers an access (1e-20). The UE starts a connection setup process, and performs a UL LBT operation to attempt a random access to the cell. However, since the unlicensed frequency in which the cell operates is congested, the UL LBT failure occurs continuously while the connection setup process is performed, and thus the connection setup process fails eventually (1e-25). If the connection setup failure occurs as many times as the connEstFailCount-lbtFailure (1e-30), the connEstFailOffset-lbtFailure value is applied to the S-Criteria being derived in the cell selection or reselection process as the Qoffsettemp value with respect to all cells operating in the unlicensed frequency to which the cell belongs (1e-35), and a timer having the connEstFailOffsetValidity-lbtFailure value is driven (1e-40). This reduces the probability of preferentially camping on the congested unlicensed frequency. That is, this has an effect of dropping the cell reselection priority of the unlicensed frequency. Until the timer expires (1e-45), the connEstFailOffset-lbtFailure value is applied to the S-Criteria (1e-50).

The continuous UL LBT failure in the cell means that the unlicensed frequency is congested. Accordingly, the parameters are frequency-specific, and if other cells exist in the unlicensed frequency in which the cell operates, the parameters are also applied to the cells. As conditions that the parameters are applied, other alternatives may exist in addition to a case that the connection setup failure occurs as many times as the connEstFailCount-lbtFailure.

Figure 1F:
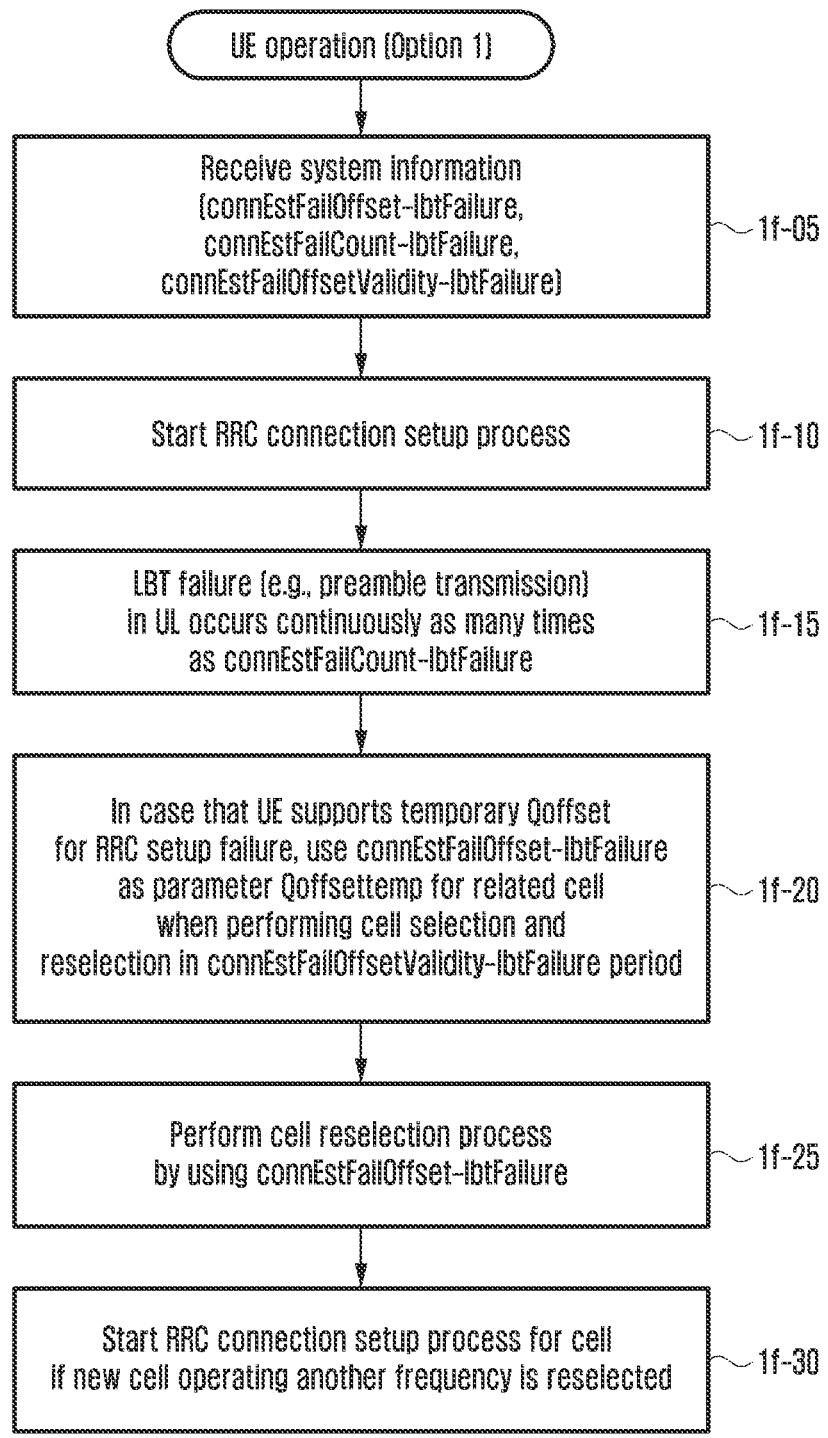
FIG. 1F is a flowchart of a UE operation for adjusting a cell reselection operation in the first embodiment.

For example, the following cases may be considered.
  When an uplink LBT failure occurs as many times as the connEstFailCount-lbtFailure
  When an RLF occurs due to the occurrence of the LBT failure as many times as the connEstFailCount-lbtFailure FIG. 1F is a flowchart of a UE operation for adjusting a cell reselection operation in the first embodiment.

At operation 1f-05, the UE is provided with the parameters from the system information being broadcasted from the base station.

At operation 1f-10, the UE triggers an RRC connection setup process.

At operation 1f-15, the UE fails the RRC connection setup process as many times as the connEstFailCount-lbtFailure due to the UL LBT failure.

At operation 1f-20, the UE applies the connEstFailOffset-lbtFailure value to the S-Criteria being derived in the cell selection or reselection process as the Qoffsettemp value with respect to all cells operating in the unlicensed frequency to which the cell belongs, and drives the timer having the connEstFailOffsetValidity-lbtFailure value.

At operation 1f-25, the UE performs the cell reselection operation by substituting the connEstFailOffset-lbtFailure for the S-Criteria of all cells belonging to the congested unlicensed frequency band.

At operation 1f-30, if the cell operating in the different frequency from the unlicensed frequency is reselected, the UE triggers the RRC connection setup process to the cell. If one of the cells belonging to the still congested unlicensed frequency is reselected although the connEstFailOffset-lbtFailure is introduced, the RRC connection setup process to the cell should be triggered, and the UL LBT operation should be performed.

FIG. 1G is a flowchart of a method for adjusting a cell reselection operation in a second embodiment.

In the second embodiment, a base station 1g-10 provides three kinds of parameters below to a UE 1g-05 through system information (1g-15). The system information is SIB1 being always broadcasted.
  cellReselectionPriority
  connEstFailCount-lbtFailure
  connEstFailOffsetValidity-lbtFailure The UE stores the parameters. The cellReselectionPriority information may be provided to the UE through an RRCRelease message. In this case, if being provided through the RRCRelease message, the cellReselectionPriority information provided through the system information is disregarded. The UE performs the cell reselection operation and camps on one cell in consideration of the cellReselectionPriority information. The UE triggers an access (1g-20). The UE starts a connection setup process, and performs a UL LBT operation to attempt a random access to the cell. However, since the unlicensed frequency in which the cell operates is congested, the UL LBT failure occurs continuously while the connection setup process is performed, and thus the connection setup process fails eventually (1g-25). If the connection setup failure occurs as many times as the connEstFailCount-lbtFailure due to the UL LBT failure (1g-30), it is considered that the unlicensed frequency to which the cell belongs has the lowest priority, or it is considered that the unlicensed frequency is in a bar (inaccessible) state (1g-35).

In this case, a timer having the connEstFailOffsetValidity-lbtFailure value is driven (1g-40). This reduces the probability of preferentially camping on the congested unlicensed frequency. That is, this has an effect of dropping the cell reselection priority of the unlicensed frequency. Until the timer expires (1g-45), the lowest cell reselection priority adjustment or the bar state is applied (1g-50). The continuous UL LBT failure in the cell means that the unlicensed frequency is congested. Accordingly, the parameters are frequency-specific, and if other cells exist in the unlicensed frequency in which the cell operates, the parameters are also applied to the cells. As conditions that the parameters are applied, other alternatives may exist in addition to a case that the connection setup failure occurs as many times as the connEstFailCount-lbtFailure.

Figure 1H:
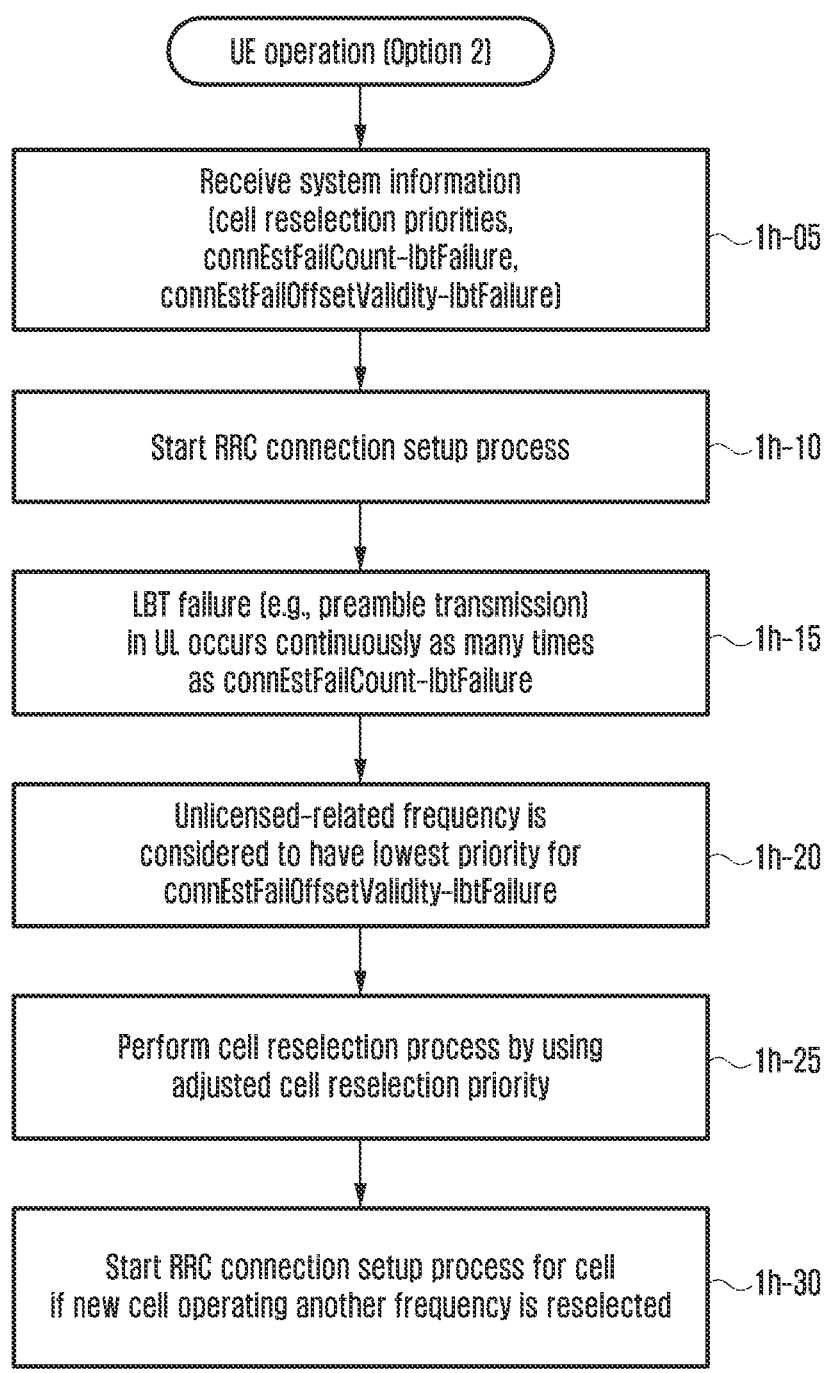
FIG. 1H is a flowchart of a UE operation for adjusting a cell reselection operation in the second embodiment.

For example, the following cases may be considered.
When an uplink LBT failure occurs as many times as the connEstFailCount-lbtFailure
When an RLF occurs due to the occurrence of the LBT failure as many times as the connEstFailCount-lbtFailure FIG. 1H is a flowchart of a UE operation for adjusting a cell reselection operation in the second embodiment.

At operation 1h-05, the UE is provided with the parameters from the system information being broadcasted from the base station.

At operation 1h-10, the UE triggers an RRC connection setup process.

At operation 1h-15, the UE fails the RRC connection setup process as many times as the connEstFailCount-lbtFailure due to the UL LBT failure.

At operation 1h-20, the UE considers that the unlicensed frequency to which the cell belongs has the lowest priority, or considers that the unlicensed frequency is in the bar (inaccessible) state. In this case, the timer having the connEstFailOffsetValidity-lbtFailure value is driven.

At operation 1h-25, the UE performs the cell reselection operation in consideration of the adjusted cell reselection priority information.

At operation 1h-30, if the cell operating in the different frequency from the congested unlicensed frequency is reselected, the UE triggers the RRC connection setup process to the cell. If one of the cells belonging to the still congested unlicensed frequency is reselected although the adjusted cell reselection priority information is introduced, the RRC connection setup process to the cell should be triggered, and the UL LBT operation should be performed.

FIG. 1I is a flowchart of a method for adjusting a cell reselection operation in a third embodiment.

In the first embodiment and the second embodiment, only in case that the RRC connection setup process fails continuously as many as a predetermined number of times due to the UL LBT failure (or in case that a condition is satisfied, on which the congestion of the corresponding unlicensed frequency is determined to be high due to the UL LBT failure), the corresponding congested unlicensed frequency is deprioritized. However, in a scenario in which the NR-U cell operating in the unlicensed frequency band and the normal cell operating in the licensed frequency band coexist, a business owner may want to configure so that the UEs preferentially camp on the normal cell operating in the licensed frequency band, or vice versa. For this, different cell reselection priority values may be given to the unlicensed frequency and the licensed frequency. As another alternative to this, in the third embodiment, the following two kinds of methods are proposed.

Option 1: A method for providing a separate Qoffsettemp for each separate unlicensed frequency and applying the value when deriving the S-Criteria of the cells belonging to the frequency in the cell selection and reselection processes. In the disclosure, the value is called QoffsetTempForUnlicensed.

Option 2: A method for providing separate ThreshX-high and ThreshX-low values being applied to the unlicensed frequency and applying them in the cell selection and reselection processes. In the disclosure, the values are called ThreshX-highForUnlicensed and ThreshX-lowForUnlicensed.

The base station 1i-10 provides the parameter to the UE 1i-05 through the system information (1i-15). In case of option 1, if the UE supports the NR-U technology, it applies the QoffsetTempForUnlicensed instead of the QoffsetTemp when deriving the S-Criteria values of the cells belonging to the corresponding unlicensed frequency (1i-20).

In case of option 2, if the UE supports the NR-U technology, it applies the ThreshX-highForUnlicensed instead of the ThreshX-high with respect to the unlicensed frequency having a higher priority value than that of the currently camping-on on frequency, and applies the ThreshX-lowForUnlicensed instead of the ThreshX-low with respect to the unlicensed frequency having a lower priority value than that of the currently camping-on frequency (1i-25).

Figure 1J:
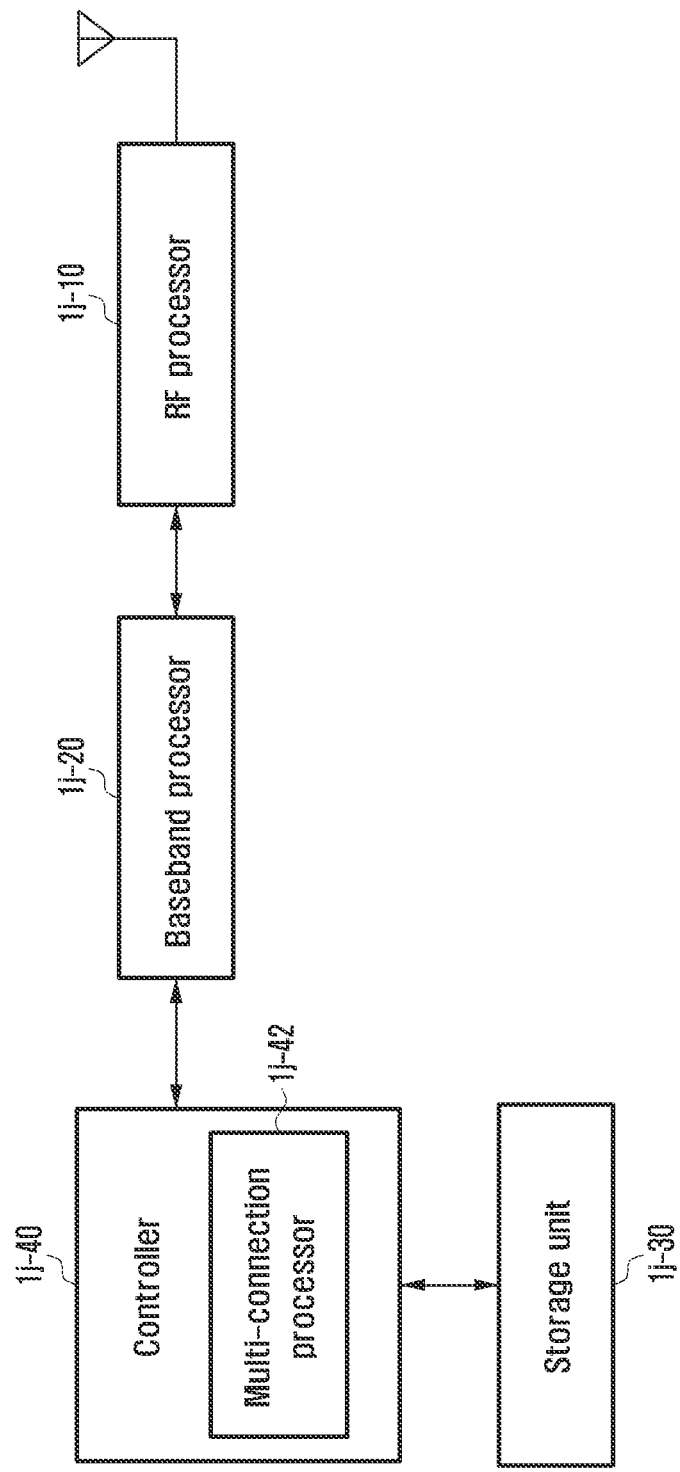
FIG. 1J is a block diagram illustrating the internal structure of a UE to which the disclosure is applied.

FIG. 1J is a block diagram illustrating the internal structure of a UE to which the disclosure is applied.

Referring to the drawing, the UE includes a radio frequency (RF) processor 1j-10, a baseband processor 1j-20, a storage unit 1j-30, and a controller 1j-40.

The RF processor 1j-10 performs a function for transmitting and receiving a signal on a radio channel, such as signal band conversion and amplification. That is, the RF processor 1j-10 performs up-conversion of a baseband signal provided from the baseband processor 1j-20 into an RF-band signal to transmit the converted signal through an antenna, and performs down-conversion of the RF-band signal received through the antenna into a baseband signal. For example, the RF processor 1j-10 may include a transmission filter, a reception filter, an amplifier, a mixer, an oscillator, a digital-to-analog converter (DAC), and an analog-to-digital converter (ADC). Although only one antenna is illustrated in FIG. 1J, the UE may be provided with a plurality of antennas. Further, the RF processor 1j-10 may include a plurality of RF chains. Further, the RF processor 1j-10 may perform beamforming For the beamforming, the RF processor 1j-10 may adjust phases and sizes of signals transmitted or received through the plurality of antennas or antenna elements. Further, the RF processor 1j-10 may perform MIMO, and may receive several layers during performing of the MIMO operation.

The baseband processor 1j-20 performs a conversion function between a baseband signal and a bit string in accordance with the physical layer standard of the system. For example, during data transmission, the baseband processor 1j-20 generates complex symbols by encoding and modulating a transmitted bit string. Further, during data reception, the baseband processor 1j-20 restores a received bit string by demodulating and decoding the baseband signal provided from the RF processor 1j-10. For example, in case of following an orthogonal frequency division multiplexing (OFDM) method, during data transmission, the baseband processor 1j-20 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 1j-20 divides the baseband signal being provided from the RF processor 1j-10 in the unit of OFDM symbols, restores the signals mapped onto the subcarriers through the fast Fourier transform (FFT) operation, and then restores the received bit string through demodulation and decoding.

The baseband processor 1j-20 and the RF processor 1j-10 transmit and receive the signals as described above. Accordingly, the baseband processor 1j-20 and the RF processor 1j-10 may be called a transmitter, a receiver, a transceiver, or a communication unit. Further, in order to support different radio access technologies, at least one of the baseband processor 1j-20 and the RF processor 1j-10 may include a plurality of communication modules. Further, in order to process signals of different frequency bands, at least one of the baseband processor 1j-20 and the RF processor 1j-10 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter wave (e.g., 60 GHz) band.

The storage unit 1j-30 stores therein a basic program for an operation of the UE, application programs, and data of configuration information. In particular, the storage unit 1j-30 may store information related to a second access node performing wireless communication using second radio access technology. Further, the storage unit 1j-30 provides stored data in accordance with a request from the controller 1j-40.

The controller 1j-40 controls the overall operation of the UE. For example, the controller 1j-40 transmits and receives signals through the baseband processor 1j-20 and the RF processor 1j-10. Further, the controller 1j-40 records or reads data in or from the storage unit 1j-30. For this, the controller 1j-40 may include at least one processor. For example, the controller 1j-40 may include a communication processor (CP) performing a control for communication and an application processor (AP) controlling a higher layer, such as an application program.

Figure 1K:
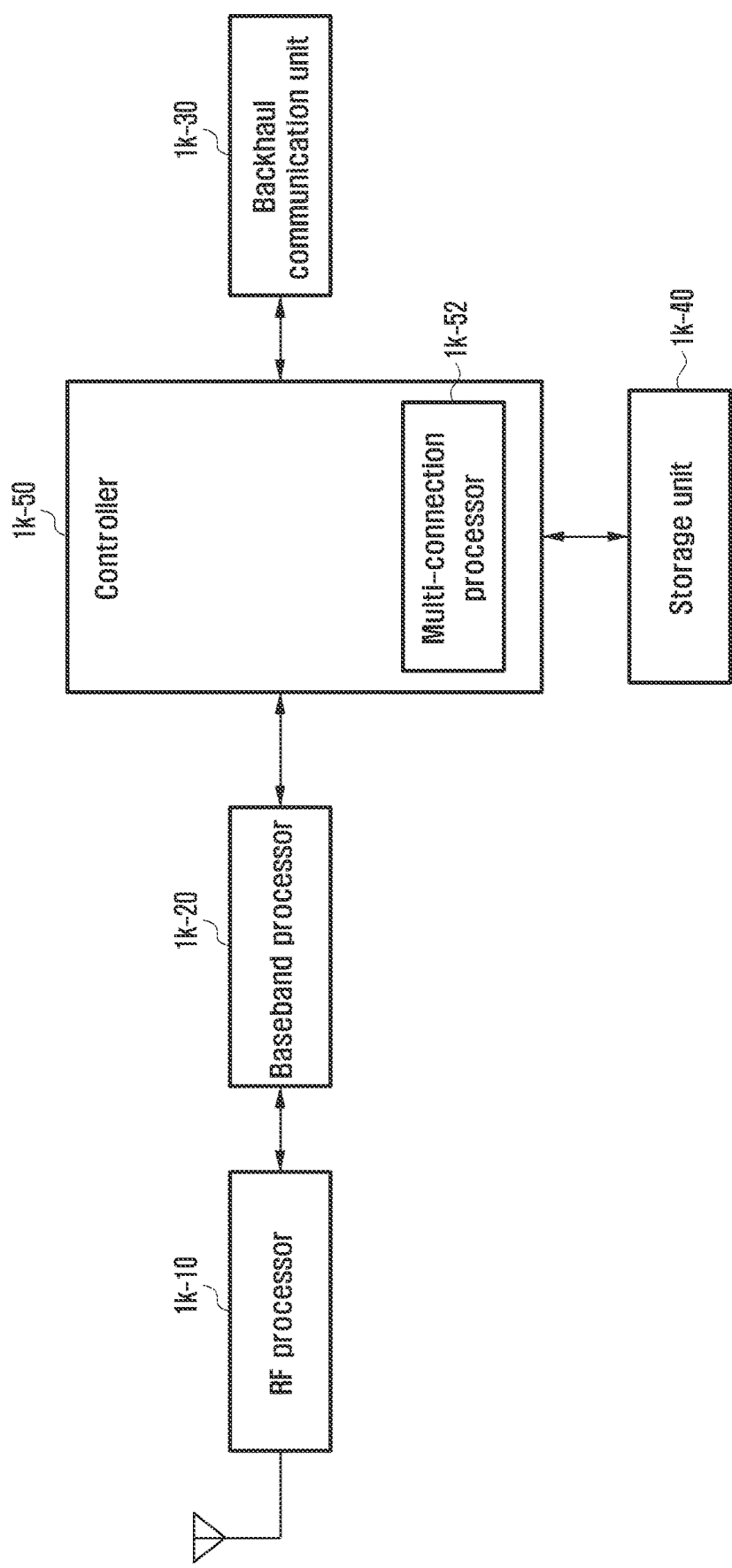
FIG. 1K is a block diagram illustrating the configuration of a base station according to the disclosure.

FIG. 1K is a block diagram illustrating the configuration of a base station according to an embodiment of the disclosure.

Referring to the drawing, a base station is configured to include an RF processor 1k-10, a baseband processor 1k-20, a backhaul communication unit 1k-30, a storage unit 1k-40, and a controller 1k-50.

The RF processor 1k-10 performs a function for transmitting and receiving a signal on a radio channel, such as signal band conversion and amplification. That is, the RF processor 1k-10 performs up-conversion of a baseband signal provided from the baseband processor 1k-20 into an RF-band signal to transmit the converted signal through an antenna, and performs down-conversion of the RF-band signal received through the antenna into a baseband signal. For example, the RF processor 1k-10 may include a transmission filter, a reception filter, an amplifier, a mixer, an oscillator, a DAC, and an ADC. Although only one antenna is illustrated in the drawing, the first access node may be provided with a plurality of antennas. Further, the RF processor 1k-10 may include a plurality of RF chains. Further, the RF processor 1k-10 may perform beamforming For the beamforming, the RF processor 1k-10 may adjust phases and sizes of signals transmitted or received through the plurality of antennas or antenna elements. The RF processor 1k-10 may perform down MIMO operation through transmission of one or more layers.

The baseband processor 1k-20 performs a conversion function between a baseband signal and a bit string in accordance with the physical layer standard of the first radio access technology. For example, during data transmission, the baseband processor 1k-20 generates complex symbols by encoding and modulating a transmitted bit string. Further, during data reception, the baseband processor 1k-20 restores a received bit string by demodulating and decoding the baseband signal provided from the RF processor 1k-10. For example, in case of following an OFDM method, during data transmission, the baseband processor 1k-20 generates complex symbols by encoding and modulating a transmitted bit string, performs mapping of the complex symbols to subcarriers, and then configures OFDM symbols through the IFFT operation and CP insertion. Further, during data reception, the baseband processor 1k-20 divides the baseband signal provided from the RF processor 1k-10 in the unit of OFDM symbols, restores the signals mapped to the subcarriers through the FFT operation, and then restores the received bit string through demodulation and decoding. The baseband processor 1k-20 and the RF processor 1k-10 transmit and receive the signals as described above. Accordingly, the baseband processor 1k-20 and the RF processor 1k-10 may be called a transmitter, a receiver, a transceiver, a communication unit, or a wireless communication unit.

The backhaul communication unit 1k-30 provides an interface for performing communication with other nodes in the network. That is, the backhaul communication unit 1k-30 converts a bit string being transmitted from the primary base station to other nodes, for example, an auxiliary base station and a core network, into a physical signal, and converts the physical signal being received from other nodes into a bit string.

The storage unit 1k-40 stores therein a basic program for an operation of the base station, application programs, and data of configuration information. In particular, the storage unit 1k-40 may store information on a bearer allocated to the connected UE and the measurement result reported from the connected UE. Further, the storage unit 1k-40 may store information that becomes a basis of determination whether to provide or suspend a multi-connection to the UE. Further, the storage unit 1k-40 provides stored data in accordance with a request from the controller 1k-50.

The controller 1k-50 controls the overall operation of the base station. For example, the controller 1k-50 transmits and receives signals through the baseband processor 1k-20 and the RF processor 1k-10 or through the backhaul communication unit 1k-30. Further, the controller 1k-50 records or reads data in or from the storage unit 1k-40. For this, the controller 1k-50 may include at least one processor.

Second Embodiment

In describing the disclosure hereinafter, detailed explanation of related known functions or configurations will be omitted if it is determined that it obscures the gist of the disclosure unnecessarily. Hereinafter, embodiments of the disclosure will be described with reference to the accompanying drawings.

Figure 2A:
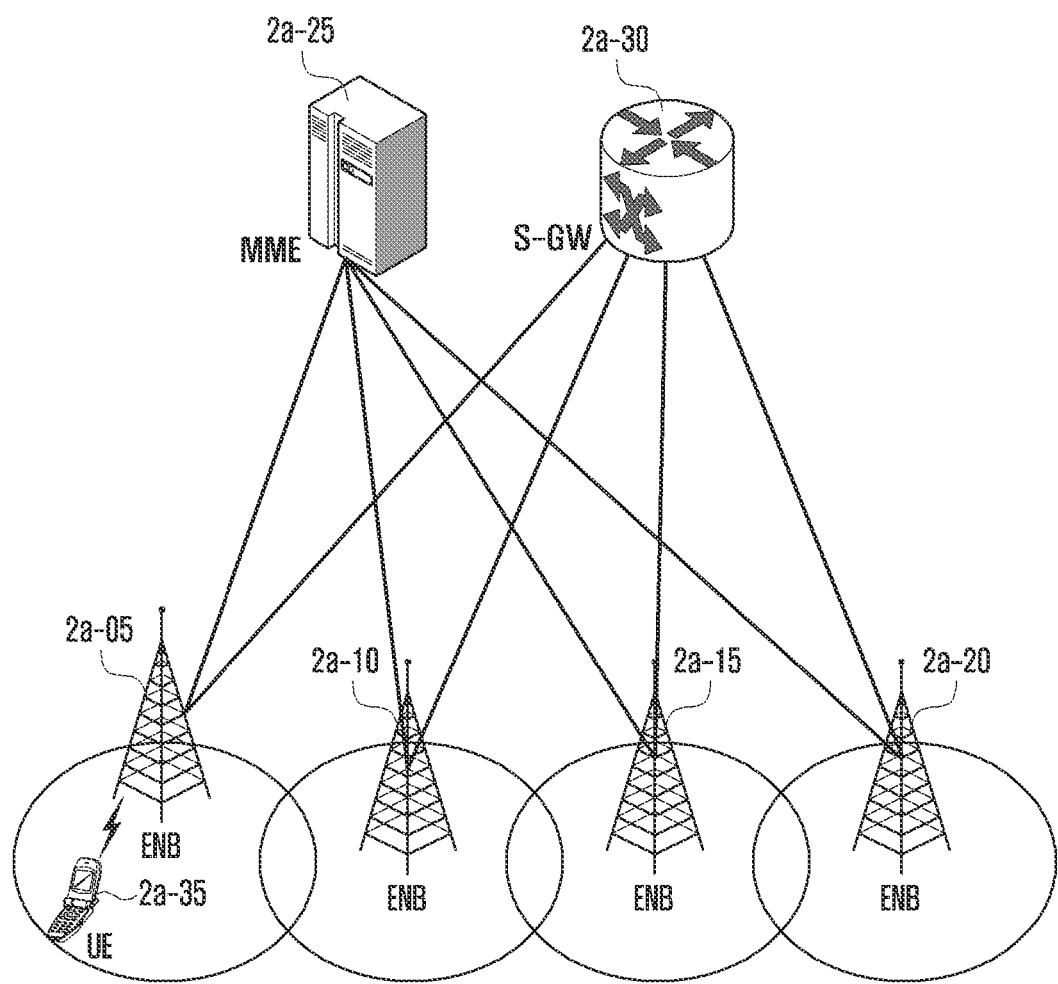
FIG. 2A is a diagram illustrating the structure of an LTE system to which the disclosure is applied.

FIG. 2A is a diagram illustrating the structure of an LTE system to which the disclosure is applied.

Referring to FIG. 2A, as illustrated, a radio access network of an LTE system is composed of evolved node Bs (hereinafter referred to as "ENBs", "node Bs", or "base stations") 2a-05, 2a-10, 2a-15, and 2a-20, a mobility management entity (MME) 2a-25, and a serving-gateway (S-GW) 2a-30. User equipment (hereinafter referred to as "UE" or "terminal") 2a-35 accesses an external network through the ENBs 2a-05 to 2a-20 and the S-GW 2a-30.

In FIG. 2A, the ENBs 2a-05 to 2a-20 correspond to existing node Bs of a universal mobile telecommunication system (UMTS). The ENBs are connected to the UE 2a-35 on a radio channel, and play more complicated roles than those of the existing node Bs. In the LTE system, since all user traffics including a real-time service, such as a voice over IP (VoIP) through an Internet protocol, are serviced on shared channels, entities performing scheduling through gathering of state information, such as a buffer state, an available transmission power state, and a channel state of UEs, are necessary, and the ENBs 2a-05 to 2a-20 take charge of this.

In general, one ENB controls a plurality of cells. For example, in order to implement a transmission speed of 100 Mbps, the LTE system uses, for example, orthogonal frequency division multiplexing (hereinafter referred to as "OFDM") as a radio access technology in a bandwidth of 20 MHz. Further, the LTE system adopts an adaptive modulation & coding (hereinafter referred to as "AMC") scheme that determines a modulation scheme and a channel coding rate to match the channel state of the UE. The S-GW 2a-30 is an entity that provides a data bearer, and generates or removes the data bearer under the control of the MME 2a-25. The MME is an entity that takes charge of not only a mobility management function of the UE but also various kinds of control functions, and is connected to the plurality of base stations.

Figure 2B:
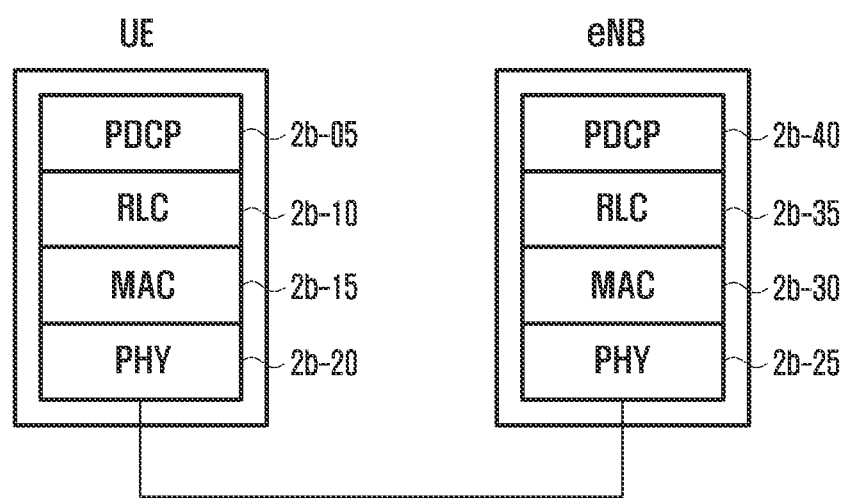
FIG. 2B is a diagram illustrating a radio protocol structure in an LTE system to which the disclosure is applied.

FIG. 2B is a diagram illustrating a radio protocol structure in an LTE system to which the disclosure is applied.

Referring to FIG. 2B, in UE or an ENB, a radio protocol of an LTE system is composed of a packet data convergence protocol (PDCP) 2b-05 or 2b-40, a radio link control (RLC) 2b-10 or 2b-35, and a medium access control (MAC) 2b-15 or 2b-30. The packet data convergence protocol (PDCP) 2b-05 or 2b-40 takes charge of IP header compression/decompression operations, and the radio link control (RLC) 2b-10 or 2b-35 performs an ARQ operation or the like by reconfiguring a PDCP packet data unit (PDU) with a proper size. The MAC 2b-15 or 2b-30 is connected to several RLC layer devices configured in one UE, and performs multiplexing of RLC PDUs into MAC PDU and demultiplexing of the RLC PDUs from the MAC PDU. A physical layer 2b-20 or 2b-25 performs channel coding and modulation of higher layer data to configure and transmit OFDM symbols on a radio channel, or performs demodulation and channel decoding of the OFDM symbols received on the radio channel to transfer the demodulated and channel-decoded OFDM symbols to a higher layer.

Figure 2C:
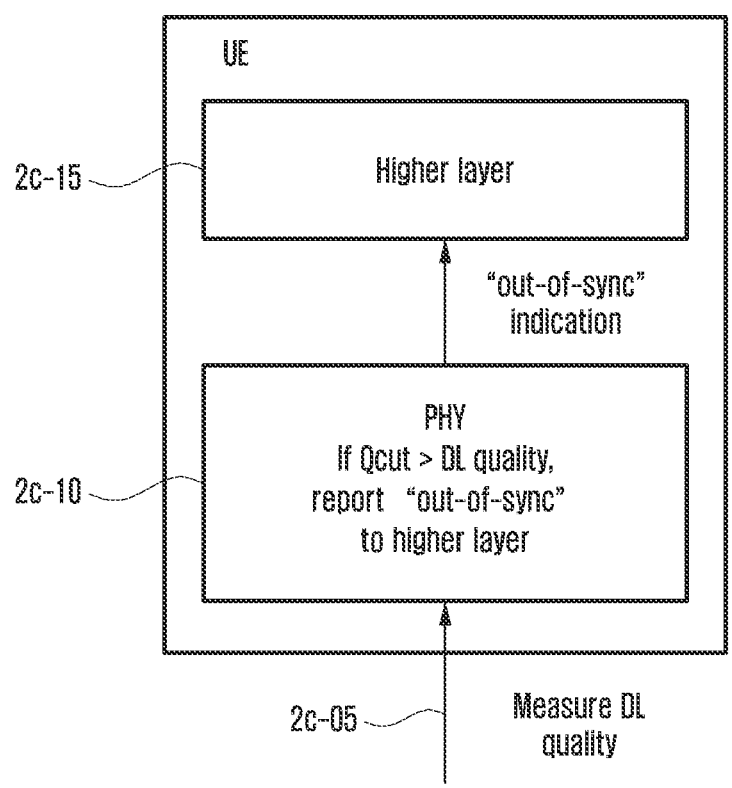
FIG. 2C is a diagram explaining a radio link monitoring (RLM) operation according to the disclosure.

FIG. 2C is a diagram explaining a radio link monitoring (RLM) operation according to the disclosure.

A UE physical layer measures a downlink signal quality from CRS of a serving cell (2c-05). It is determined whether the signal quality is lower than a specific threshold value Qout (2c-10). The threshold value is a signal quality value corresponding to a specific BLER being measured on a PDCCH. If the signal quality is lower than the specific threshold value Qout, the physical layer transfers an "out-of-sync" indicator to a higher layer. In LTE technology, the above operation is called an RLM. If the indicator is transferred to the higher layer over a specific number of times, the higher layer drives a specific timer, and when the timer expires, the higher layer declares the RLF (2c-15).

Figure 2D:
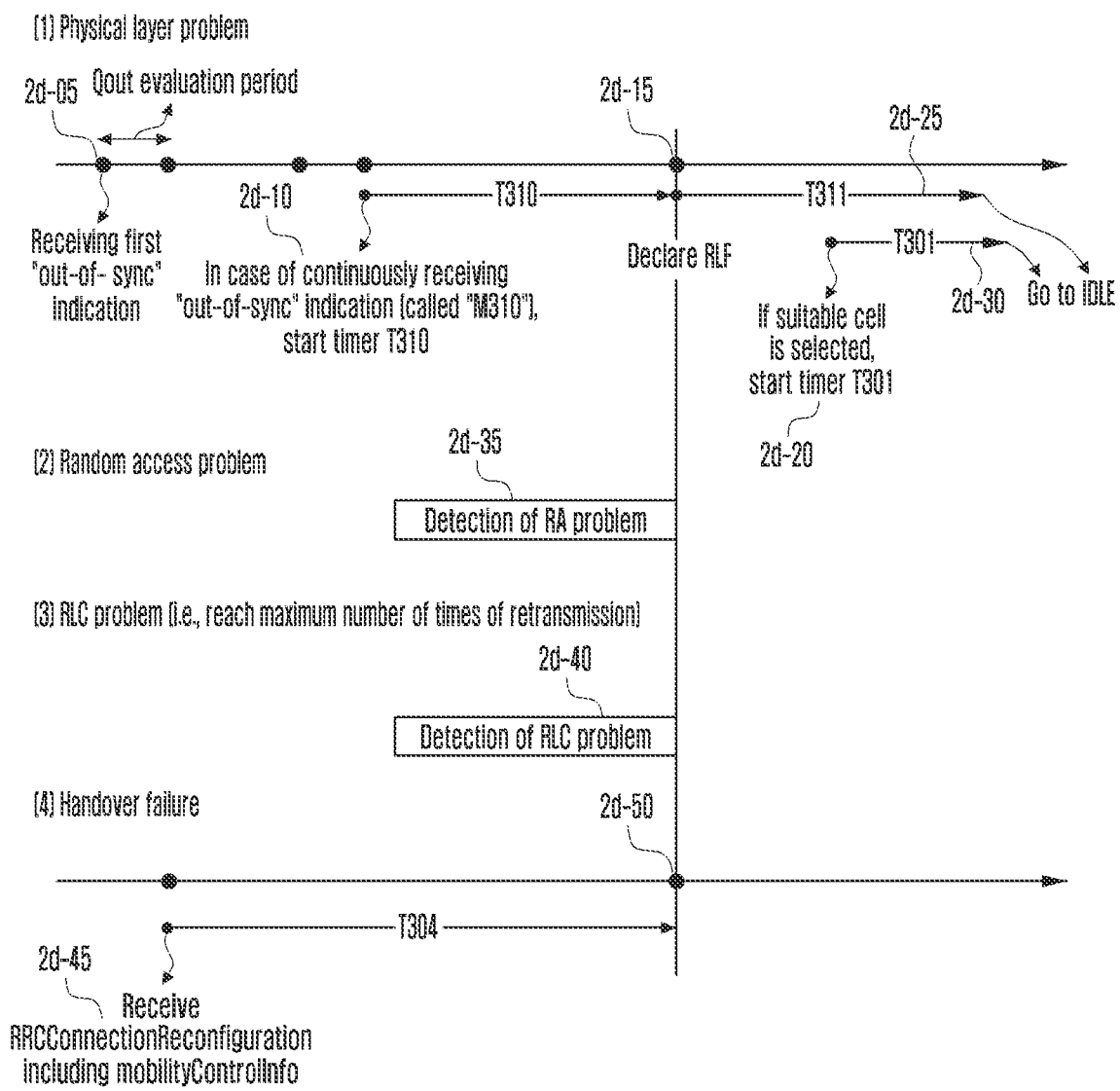
FIG. 2D is a diagram explaining a radio link failure (RLF) operation according to the disclosure.

FIG. 2D is a diagram explaining a radio link failure (RLF) operation according to the disclosure.

As described above, the RLF may be declared in accordance with the result from the RLM. The UE physical layer determines whether the downlink signal quality from the CRS of the serving cell is lower than the specific threshold value Qout in every specific period, i.e., every Qout evaluation period. If the signal quality is lower than the specific threshold value Qout, the physical layer transfers the "out-of-sync" indicator to the higher layer. If the indicator is transferred to the higher layer as many as a specific number of times N310 after the minimum indicator is transferred to the higher layer (2d-05), the specific timer T310 is driven (2d-10).

The physical layer also determines whether the downlink signal quality from the CRS of the serving cell is higher than the specific threshold value Qin. If the signal quality is higher than the specific threshold value Qin, the physical layer transfers an "in-sync" indicator to the higher layer. If the indicator is transferred to the higher layer as many as a specific number of times, the timer T310 being driven is stopped. If the timer T310 is not stopped, but expires, the higher layer declares the RLF (2d-15). After the RLF declaration, the UE drives another timer T311. The UE searches for a new suitable cell, and if the UE is unable to search for the new cell until the T311 expires, the UE is switched to a standby mode (2d-25). If the new suitable cell is searched for before the timer expires, the timer T310 is driven, and the reestablishment process to the cell is performed (2d-20). If the reestablishment is not successfully completed before the timer T301 expires, the UE is switched to the standby mode (2d-30).

If the reestablishment has succeeded, the UE continues the connection mode to the cell. The RLF may be declared by the RLM operation, and may also be declared in accordance with another condition. Even if a random access has failed, the RLF may be declared (2d-35). Further, even if the RLC layer reaches the maximum number of times of retransmission, or even if a packet is unable to be successfully transferred, the RLF is declared (2d-40). The explanation of the operations of the T301 and T311 is as follows.

TABLE 3

| Timer | Drive | Stop | Expiration |
|---|---|---|---|
| T301 | Upon transmission of RRCReestabilshmentRequest | Upon reception of RRCReestablishment or RRCSetupmessage as well as when the selected cell becomes unsuitable | Go to RRC_IDLE |
| T311 | Upon initiating the RRC connection re-establishment procedure | Upon selection of a suitable NR cell or a cell using another RAT | Enter RRC_IDLE |

Another case that the RLF is declared is a case that handover has failed. If handover configuration information or an RRCConnectionReconfiguration message including mobilityControlInfo IE is received (2d-45), the UE drives a timer T304. The timer value of the T304 is provided from the mobilityControlInfo. If the random access to a target cell is not successfully completed before the timer expires, it is considered as the handover failure, and the RLF is declared (2d-50).

Figure 2E:
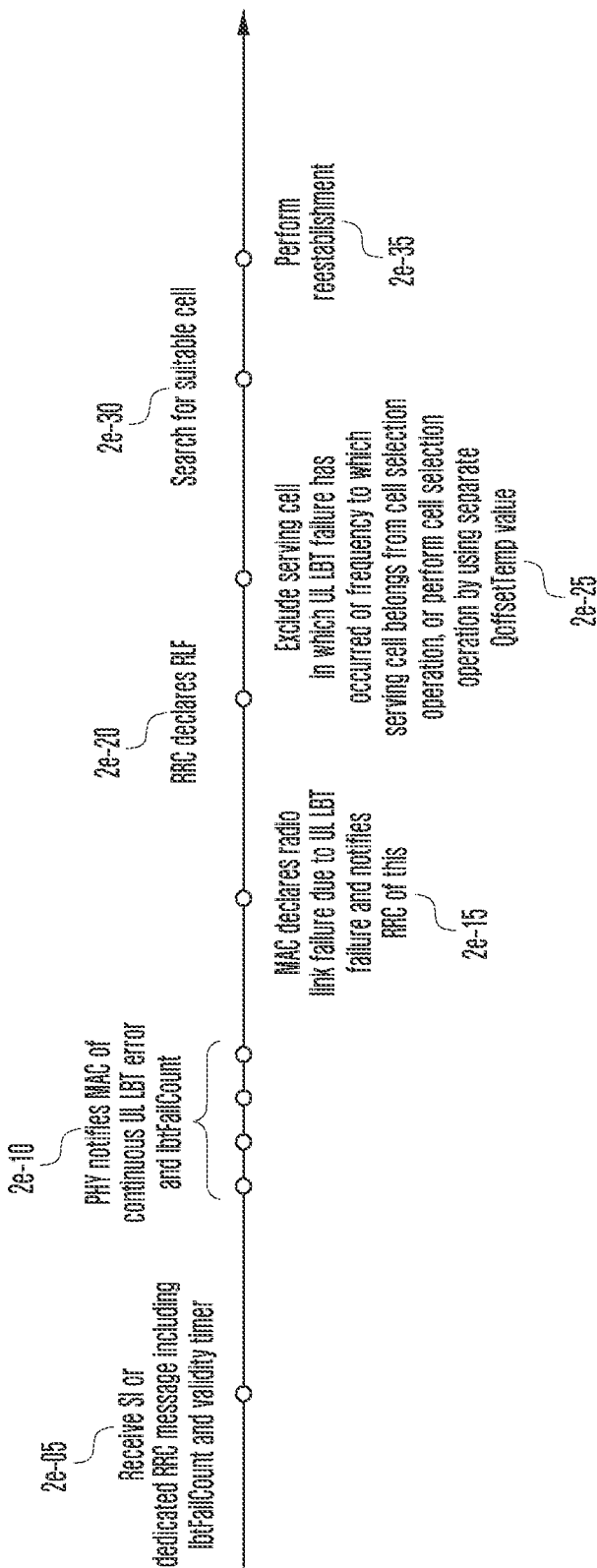
FIG. 2E is a diagram explaining an RLF and a reestablishment operation triggered due to a continuous UL LBT failure according to the disclosure.

FIG. 2E is a diagram explaining an RLF and a reestablishment operation triggered due to a continuous UL LBT failure according to the disclosure.

A UE, which is connected to an NR cell operating in an unlicensed frequency and transmits/receives data, or which performs a handover operation, may continuously suffer a UL LBT failure. Further, such a continuous UL LBT failure may cause an RLF. In this case, through a cell selection operation, the UE searches for a suitable cell, and performs a reestablishment operation to the cell. However, this is because the UL LBT failure is not caused by an inferior channel quality of a previous cell, but is caused by a congested uplink. Accordingly, there is a high possibility that the previous cell is reselected in the cell selection operation, and if the congestion in the corresponding unlicensed frequency does not suddenly get better although the reestablishment operation is performed, the UL LBT failure will occur again. That is, the reestablishment will fail due to the UL LBT failure.

The disclosure proposes a method for excluding the cell in which the UL LBT failure has occurred (or frequency to which the cell belongs) from the cell selection operation after the RLF in case that the RLF occurs due to the UL LBT failure.

The UE is provided with two parameters, lbtFailCount and validity timer, through the system information being broadcasted from the base station or dedicated RRC signaling (2e-05). The physical layer of the UE detects the UL LBT failure, and notifies the MAC layer of the UE whether the UL LBT failure has occurred as many times as the lbtFailCount (2e-10). Alternatively, the physical layer may notify the MAC layer of the UL LBT failure every time, and the MAC layer may determine whether the UL LBT failure has occurred as many as the number of times of the lbtFailCount. If it is recognized that the UL LBT failure has occurred as many as the number of times of the lbtFailCount, the MAC layer notifies the RRC of the UE of this (2e-15). In this case, the RRC declares the RLF due to the UL LBT failure (2e-20). The UE triggers the cell selection operation, and searches for one suitable cell (2e-25).

The UE determines whether the RLF has occurred due to the UL LBT failure. If the RLF has occurred due to the UL LBT failure, the serving cell in which the UL LBT failure has occurred or the frequency to which the serving cell belongs is excluded from the cell selection operation. That is, the frequency is not considered as the frequency being considered in the cell selection operation (it is considered as the bar state). Further, the timer having the validity timer value is driven. Until the timer expires, the frequency is excluded from the cell selection operation.

As another alternative, a separate QoffsetTemp value is defined. The value is provided by the corresponding cell through the system information or dedicated RRC signaling. If the RLF has occurred due to the UL LBT failure, the new QoffsetTemp value is applied when the S-Criteria of the serving cell in which the UL LBT failure has occurred or all cells belonging to the corresponding frequency are derived while the cell selection operation is performed. Further, the timer having the validity timer value is driven. The value is applied until the timer expires.

The UE triggers the reestablishment operation to the suitable cell 2e-30 selected by applying the method (2e-35).

Figure 2F:
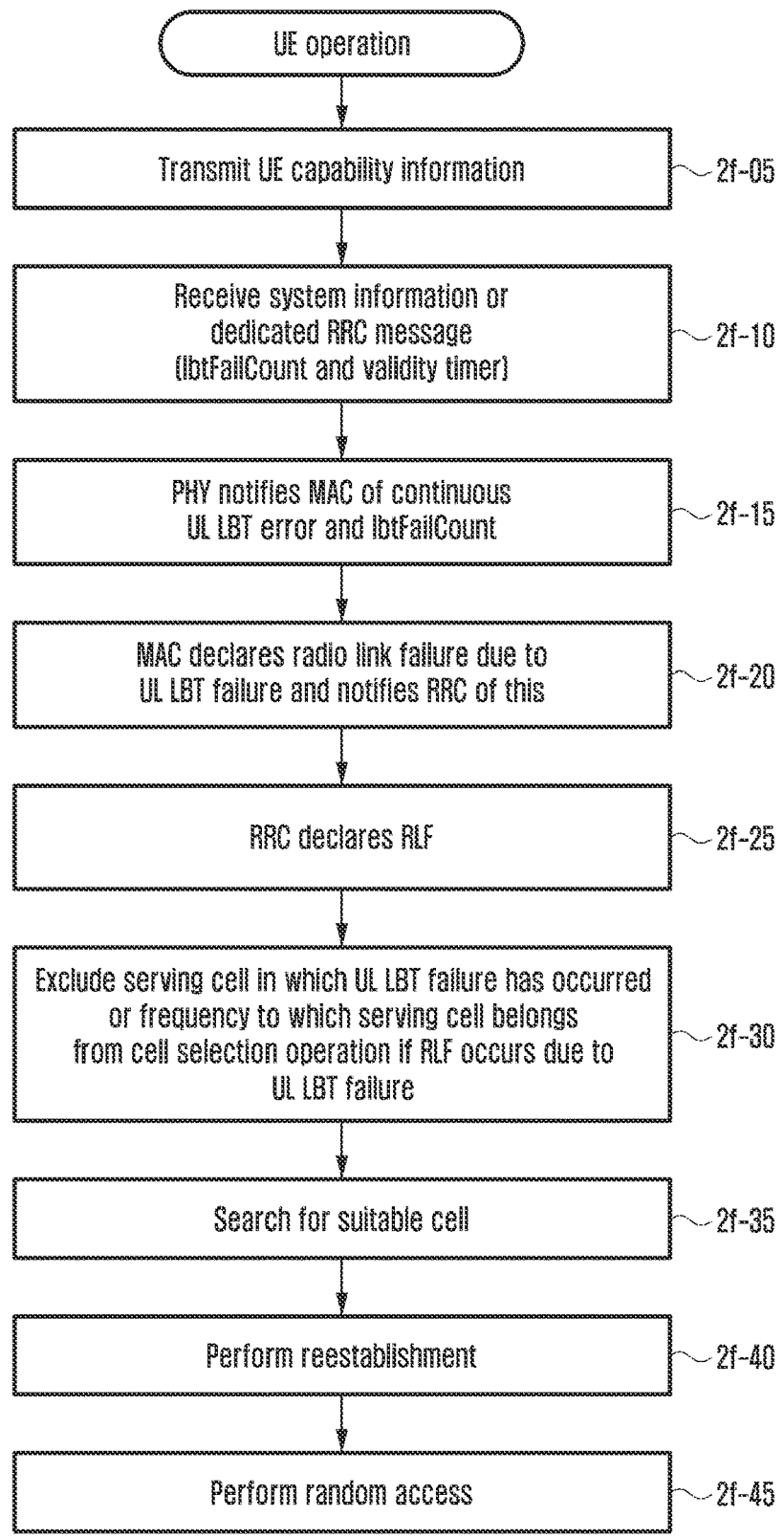
FIG. 2F is a flowchart of a UE operation for performing cell selection and reestablishment operations after an RLF according to the disclosure.

FIG. 2F is a flowchart of a UE operation for performing cell selection and reestablishment operations after an RLF according to the disclosure.

At operation 2f-05, the UE transmits UE capability information to the base station.

At operation 2f-10, the UE is provided with two parameters, lbtFailCount and validity timer, through the system information being broadcasted from the base station or dedicated RRC signaling.

At operation 2f-15, the physical layer of the UE detects the UL LBT failure, and notifies the MAC layer of the UE of this.

At operation 2f-20, the MAC layer of the UE notifies the RRC of the UE that the UL LBT failure has occurred as many as the number of times of the lbtFailCount.

At operation 2f-25, the RRC of the UE declares the RLF due to the UL LBT failure.

At operation 2f-30, if the RLF has occurred due to the UL LBT failure, the UE excludes the previous serving cell in which the RLF has occurred or the frequency to which the serving cell belongs from the cell selection operation. This rule is effective until a specific time expires.

At operation 2f-35, the UE has searched for one suitable cell through the cell selection operation.

At operation 2f-40, the UE triggers the reestablishment operation to the cell.

At operation 2f-45, the UE performs a random access to the cell for the above operation.

Figure 2G:
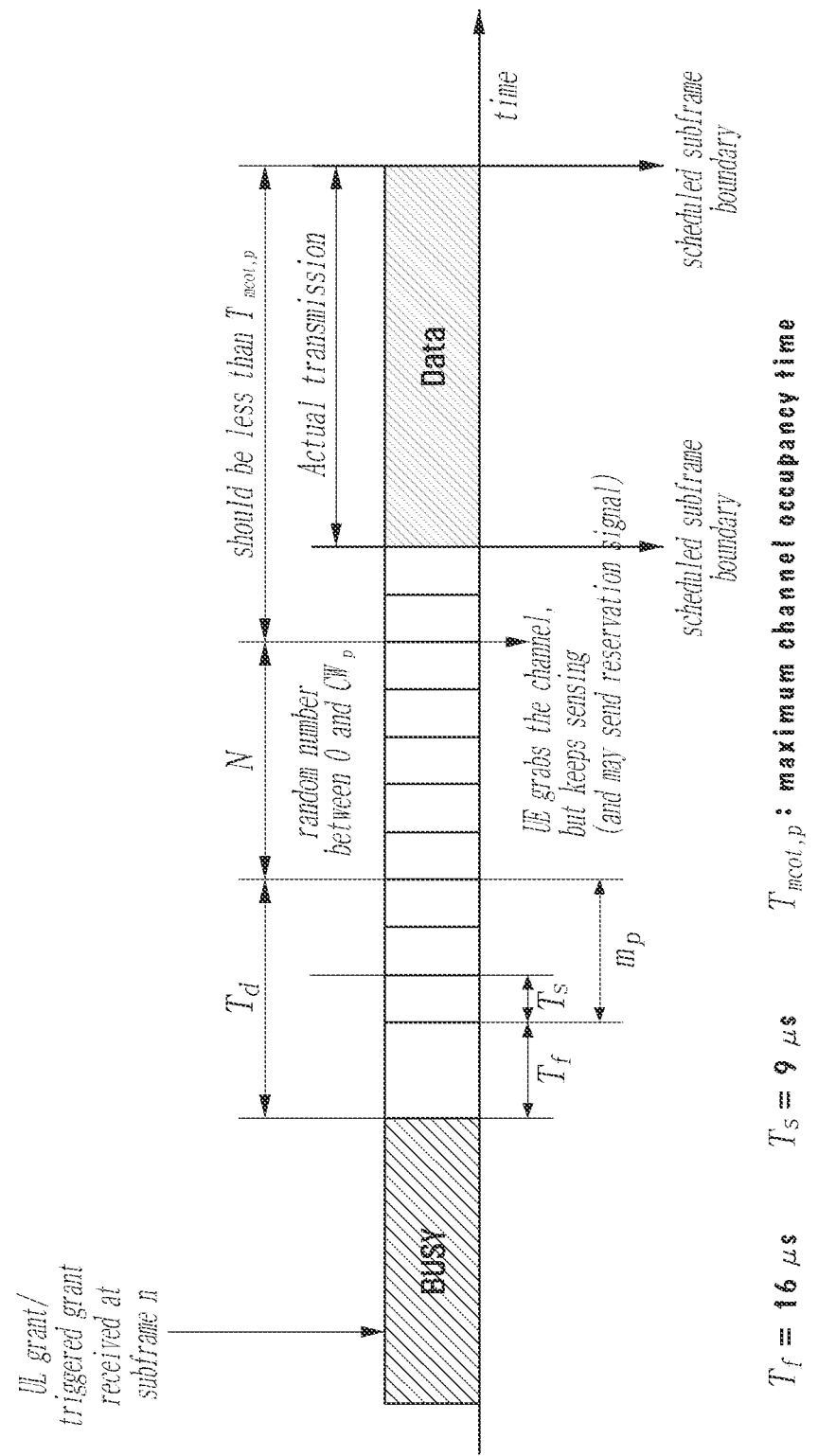
FIG. 2G is a diagram describing LBT Type 1.
Figure 21I:
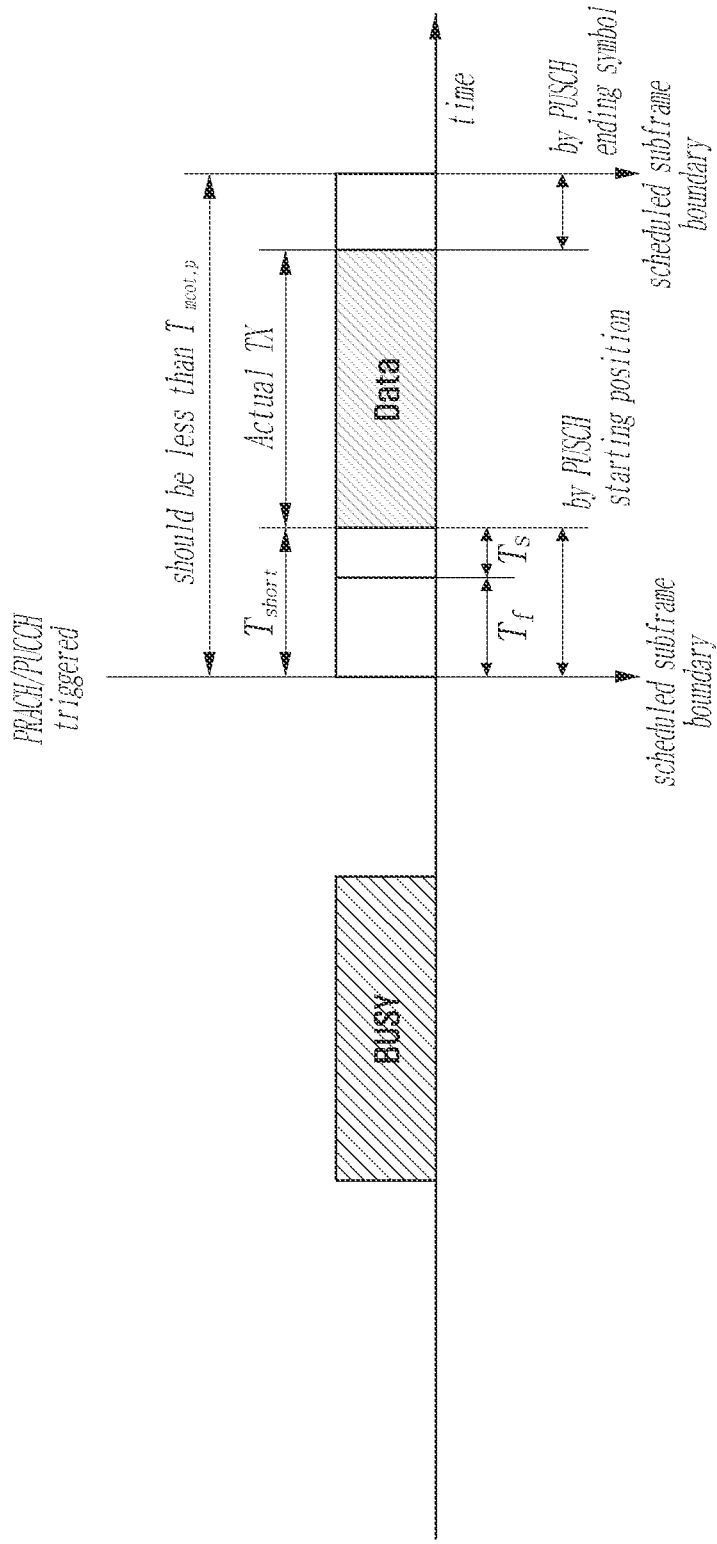

FIG. 2G is a diagram describing LBT Type 1.

LBT Type 1 is a method for randomly determining a time when it is heard whether other peripherals transmit before transmission, and performing transmission while a channel is empty for the corresponding random time. In this case, it is first heard for a fixed time Td, and if the channel is empty, it is determined whether the channel is empty for the random time N.

In this case, how to determine the values of Td and N may be differentially determined in accordance with the priority and importance of the traffic, and there are the total four kinds of differential classes. The class is referred to as a channel access priority class (CAPC).

Further, in accordance with the CAPC, the time lengths Td and N are Td=16+mp*9 (μs) and N=random (0, CWp)*9 (μs), respectively, and the CW value starts from CWmin,p, increases about twice whenever the transmission fails, and has the maximum value of CWmax,p. For example, in case of performing the LBT using the method in which the CAPC is 3, the Td has the length of 16+3*9=43 μs, and N is selected as a random value in the range of 0 to 15 in case of an initial transmission. For example, in case of selecting 7, N becomes 7*9=63 μs, and a communication device transmits data when the channel is empty for 106 μs.

TABLE 4

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the above example (in case of selecting 7 for N), if it is determined that the channel is occupied by another device (i.e., if the received signal strength (RSSI) is equal to or higher than a predetermined threshold value) in the middle of determining whether the channel is empty (e.g., in case that 4 of the selected 7 remains after 3 has passed by), the UE waits for until the corresponding channel occupation ends, and then performs transmission by determining whether the channel is empty for the remaining time of 4 after waiting for the Td again.

As can be known from the table, the LBT method having a low CAPC is used when transmitting the traffic having a high priority.

FIG. 2H is a diagram describing LBT Type 2.

LBT Type 2 is a method for immediate transmission in case that the time when it is heard whether other peripherals transmit before transmission is fixed, and thus the channel is empty for the corresponding fixed time. That is, the LBT Type 2 is an immediate transmission method in which the channel is heard (sensed) for the fixed time of Tshort (=Tf+Ts) when the communication device needs transmission in the exemplary drawing, and if it is determined that the channel is empty, data is immediately transmitted. That is, the LBT Type 2 is an LBT method that can be used when a signal having a very high priority is transmitted. Accordingly, the random access preamble and the PUCCH as described above in FIG. 2G are signals having high importance, and thus should be transmitted using the present LBT method.

Figure 2I:
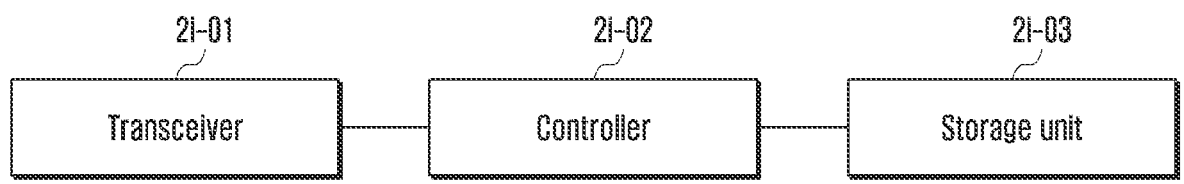
FIG. 2I is a diagram illustrating the structure of a UE according to an embodiment of the disclosure.

FIG. 2I is a diagram illustrating the structure of a UE according to an embodiment of the disclosure.

Referring to FIG. 2I, the UE may include a transceiver 2i-01, a UE controller 2i-02, and a storage unit 2i-03. In the disclosure, the UE controller 2i-02 may be defined as a circuit or application-specific integrated circuit or at least one processor.

The transceiver 2i-01 may transmit and receive signals to and from another network entity. For example, the transceiver 2i-01 may receive SIB or dedicated RRC signaling being broadcasted from a base station according to an embodiment of the disclosure.

The UE controller 2i-02 may control the overall operation of the UE according to an embodiment proposed in the disclosure. For example, the UE controller 2i-02 may control signal flow between respective blocks so as to perform an operation according to the above-described drawings and flowcharts. Specifically, the UE controller 2i-02 may control the transceiver 2i-01 to determine whether the UL LBT has failed by using parameter and timer values included in an SIB message, and to perform an RRC reestablishment operation onto a suitable cell.

The storage unit 2i-03 may store at least one of information being transmitted and received through the transceiver 2i-01 and information being generated through the UE controller 2i-02.

Figure 2J:
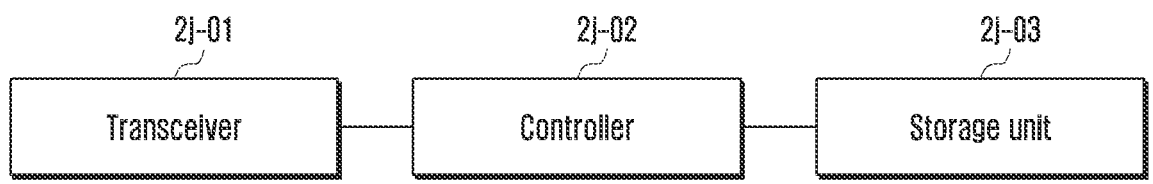
FIG. 2J is a diagram illustrating the structure of a base station according to an embodiment of the disclosure.

FIG. 2J is a diagram illustrating the structure of a base station according to an embodiment of the disclosure.

Referring to FIG. 2J, the base station may include a transceiver 2j-01, a base station controller 2j-02, and a storage unit 2j-03. In the disclosure, the base station controller 2j-02 may be defined as a circuit or application-specific integrated circuit or at least one processor.

The transceiver 2j-01 may transmit and receive signals to and from another network entity. For example, the transceiver 2j-01 may broadcast SIB according to an embodiment of the disclosure.

The base station controller 2j-02 may control the overall operation of the base station according to an embodiment proposed in the disclosure. For example, the base station controller 2j-02 may control the transceiver 2j-01 to receive capability information from the UE, and to include and broadcast parameter and timer information for determining whether the UL LBT of the UE has failed to the SIB.

The storage unit 2j-03 may store at least one of information being transmitted and received through the transceiver 2j-01 and information being generated through the base station controller 2j-02.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form . . .

Meanwhile, although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims but also equivalents thereof.

The invention claimed is:

1. A method performed by a terminal for a cell reselection in a wireless communication system, the method comprising:
receiving system information including parameter information related to a listen before talk (LBT) failure, wherein the parameter information includes count information on a number of times that the terminal detects a LBT failure, and timer information for maintaining a priority associated with a cell reselection;
performing at least one LBT to a cell in an unlicensed frequency band;
identifying that LBT failures are detected as the number of times configured by the count information;
determining a priority for the cell in the unlicensed frequency band as a lowest priority based on the number of times of the LBT failures, wherein the priority for the cell is maintained while a timer configured by the timer information is running; and
performing the cell reselection based on the determined priority.

2. The method of claim 1,
wherein the parameter information further includes offset information associated with the cell reselection in unlicensed frequency bands, and
wherein the performing of the cell reselection includes determining cell selection criteria for a cell in a frequency band while the timer is running by subtracting a value indicated by the offset information from received signal information.

3. The method of claim 1, wherein the parameter information further includes priority information for the unlicensed frequency band.

4. The method of claim 1,
wherein the system information further includes threshold information for unlicensed frequency bands, the threshold information being associated with a quality of service (QOS) for a channel, and
wherein in case that the cell reselection is performed in one of the unlicensed frequency bands, the cell reselection is further based on the threshold information.

5. A method performed by a base station in a wireless communication system, the method comprising:
identifying parameter information related to a listen before talk (LBT) failure, wherein the parameter information includes count information on a number of times that a terminal detects a LBT failure, and timer information for maintaining a priority associated with a cell reselection;
generating system information including the identified parameter information related to the LBT failure; and
transmitting, to the terminal, the generated system information,
wherein in case that at least one LBT is performed by the terminal to a cell in an unlicensed frequency band and LBT failures are detected as the number of times configured by the count information, a priority for the cell in the unlicensed frequency band is determined as a lowest priority associated with the cell reselection, and
wherein the priority for the cell is maintained while a timer configured by the timer information is running.

6. A terminal performing a cell reselection in a wireless communication system, the terminal comprising:
a transceiver configured to transmit and receive signals to and from a base station; and
a controller configured to:
receive system information including parameter information related to a listen before talk (LBT) failure, wherein the parameter information includes count information on a number of times that the terminal detects a LBT failure, and timer information for maintaining a priority associated with a cell reselection,
perform at least one LBT to a cell in an unlicensed frequency band,
identify that LBT failures are detected as the number of times configured by the count information,
determine a priority for the cell in the unlicensed frequency band as a lowest priority based on the number of times of the LBT failures, wherein the priority for the cell is maintained while a timer configured by the timer information is running, and
perform the cell reselection based on the determined priority.

7. The terminal of claim 6,
wherein the parameter information further includes offset information associated with the cell reselection in unlicensed frequency bands, and
wherein the controller is further configured to determine cell selection criteria for a cell in a frequency band while the timer is running by subtracting a value indicated by the offset information from received signal information.

8. The terminal of claim 6, wherein the parameter information further includes priority information for the unlicensed frequency band.

9. The terminal of claim 6, wherein the controller is further configured to trigger a radio resource control (RRC) connection setup process based on a reselected cell.

10. A base station in a wireless communication system comprising:
a transceiver configured to transmit and receive signals to and from a terminal -; and
a controller configured to:
identify parameter information related to a listen before talk (LBT) failure, wherein the parameter information includes count information on a number of times that a terminal detects a LBT failure, and timer information for maintaining a priority associated with a cell reselection,
generate system information including the identified parameter information related to the LBT failure, and
transmit, to the terminal, the generated system information,
wherein in case that at least one LBT is performed by the terminal to a cell in an unlicensed frequency band and LBT failures are detected as the number of times configured by the count information, a priority for the cell in the unlicensed frequency band is determined as a lowest priority associated with the cell reselection, and
wherein the priority for the cell is maintained while a timer configured by the timer information is running.

* * * * *